US009378290B2

(12) United States Patent
Scott et al.

(10) Patent No.: US 9,378,290 B2
(45) Date of Patent: Jun. 28, 2016

(54) SCENARIO-ADAPTIVE INPUT METHOD EDITOR

(75) Inventors: Matthew Robert Scott, Beijing (CN); Huihua Hou, Beijing (CN); Weipeng Liu, Beijing (CN); Hao Wei, Beijing (CN); Chiwei Che, Beijing (CN); Byron Huntley Changuion, Bellevue, WA (US); Weijiang Xu, Beijing (CN); Xi Chen, Tianjin (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 899 days.

(21) Appl. No.: 13/331,023

(22) Filed: Dec. 20, 2011

(65) Prior Publication Data

US 2013/0159920 A1 Jun. 20, 2013

(51) Int. Cl.
*G06F 17/30* (2006.01)
*G06F 17/24* (2006.01)
*G06F 17/27* (2006.01)

(52) U.S. Cl.
CPC .......... *G06F 17/3087* (2013.01); *G06F 17/24* (2013.01); *G06F 17/276* (2013.01)

(58) Field of Classification Search
CPC .... G06F 17/3087; G06F 17/276; G06F 17/21
USPC .......................................... 715/780, 816, 817
See application file for complete search history.

(56) References Cited

U.S. PATENT DOCUMENTS

| 4,559,604 A | 12/1985 | Ichikawa et al. |
| 5,796,866 A | 8/1998 | Sakurai et al. |
| 5,873,107 A | 2/1999 | Borovoy et al. |
| 5,987,415 A | 11/1999 | Breese et al. |
| 5,995,928 A | 11/1999 | Nguyen et al. |
| 6,014,638 A | 1/2000 | Burge et al. |
| 6,076,056 A | 6/2000 | Huang et al. |
| 6,085,160 A | 7/2000 | D'hoore et al. |
| 6,092,044 A | 7/2000 | Baker et al. |
| 6,236,964 B1 | 5/2001 | Tamura et al. |
| 6,247,043 B1 | 6/2001 | Bates et al. |
| 6,363,342 B2 | 3/2002 | Shaw et al. |

(Continued)

FOREIGN PATENT DOCUMENTS

| CN | 1851617 | 10/2006 |
| CN | 101276245 | 10/2008 |

(Continued)

OTHER PUBLICATIONS

U.S. Appl. No. 12/960,258, filed Dec. 3, 2010, Wei et al., "Wild Card Auto Completion," 74 pages.
U.S. Appl. No. 13/109,021, filed May 17, 2011, Matthew Robert Scott, "Network Search for Writing Assistance," 43 pages.
Gamon et al., "Using Statistical Techniques and Web Search to Correct ESL Errors," Published 2009, retrieved from <<http://research.microsoft.com/pubs/81312/Calico_published.pdf>>, CALICO Journal, vol. 26, No. 3, 2009, 21 pages.
"Google Scribe," retrieved at <<http://www.scribe.googlelabs.com/>>, retrieved date: Feb. 3, 2011, 1 page.

(Continued)

*Primary Examiner* — Anil Bhargava
(74) *Attorney, Agent, or Firm* — Sandy Swain; Micky Minhas; Lee & Hayes PLLC

(57) ABSTRACT

An input method editor (IME) described herein couples scenarios of the input of the user with specific network services to offer more relevant and richer candidates for higher input productivity. Data relating to a computer application in which the input candidates are to be input and/or context relating to a user-submitted query is collected and analyzed to determine a scenario. The input candidates may include text candidates and rich candidates. The IME may select a scenario-tuned and type specific engine to identify the text candidates and/or rich candidates. The scenario-tuned text candidate engines leverage scenario-tuned language models and lexicons, and the scenario-tuned rich candidate engines leverage scenario-relevant web services, such as image, mapping, and video search, when available and appropriate.

20 Claims, 16 Drawing Sheets

(56) References Cited

U.S. PATENT DOCUMENTS

| | | |
|---|---|---|
| 6,377,965 B1 | 4/2002 | Hachamovitch et al. |
| 6,408,266 B1 | 6/2002 | Oon |
| 6,460,015 B1 | 10/2002 | Hetherington et al. |
| 6,731,307 B1 | 5/2004 | Strubbe et al. |
| 6,732,074 B1 | 5/2004 | Kuroda |
| 6,801,893 B1 | 10/2004 | Backfried et al. |
| 6,941,267 B2 | 9/2005 | Matsumoto |
| 6,963,841 B2 | 11/2005 | Handal et al. |
| 7,069,254 B2 | 6/2006 | Foulger et al. |
| 7,089,504 B1 | 8/2006 | Froloff |
| 7,099,876 B1 | 8/2006 | Hetherington et al. |
| 7,107,204 B1 | 9/2006 | Liu et al. |
| 7,165,032 B2 | 1/2007 | Bellegarda |
| 7,194,538 B1 | 3/2007 | Rabe et al. |
| 7,224,346 B2 | 5/2007 | Sheng |
| 7,277,029 B2 | 10/2007 | Thiesson et al. |
| 7,308,439 B2 | 12/2007 | Baird et al. |
| 7,353,247 B2 | 4/2008 | Hough et al. |
| 7,360,151 B1 | 4/2008 | Froloff |
| 7,370,275 B2 | 5/2008 | Haluptzok et al. |
| 7,389,223 B2 | 6/2008 | Atkin et al. |
| 7,447,627 B2 | 11/2008 | Jessee et al. |
| 7,451,152 B2 | 11/2008 | Kraft et al. |
| 7,490,033 B2 | 2/2009 | Chen et al. |
| 7,505,954 B2 | 3/2009 | Heidloff et al. |
| 7,512,904 B2 | 3/2009 | Matthews et al. |
| 7,555,713 B2 | 6/2009 | Yang |
| 7,562,082 B2 | 7/2009 | Zhou |
| 7,565,157 B1 | 7/2009 | Ortega et al. |
| 7,599,915 B2 | 10/2009 | Hill et al. |
| 7,676,517 B2 | 3/2010 | Hurst-Hiller et al. |
| 7,689,412 B2 | 3/2010 | Wu et al. |
| 7,725,318 B2 | 5/2010 | Gavalda et al. |
| 7,728,735 B2 | 6/2010 | Aaron et al. |
| 7,752,034 B2 | 7/2010 | Brockett et al. |
| 7,844,599 B2 * | 11/2010 | Kasperski ......... G06F 17/30967 707/713 |
| 7,881,934 B2 | 2/2011 | Endo et al. |
| 7,917,355 B2 * | 3/2011 | Wu ..................... G06F 17/2223 704/1 |
| 7,917,488 B2 | 3/2011 | Niu et al. |
| 7,930,676 B1 | 4/2011 | Thomas |
| 7,953,730 B1 | 5/2011 | Bleckner et al. |
| 7,957,955 B2 | 6/2011 | Christie et al. |
| 7,957,969 B2 | 6/2011 | Alewine et al. |
| 7,983,910 B2 | 7/2011 | Subramanian et al. |
| 8,161,073 B2 | 4/2012 | Connor |
| 8,230,336 B2 | 7/2012 | Morrill |
| 8,539,359 B2 | 9/2013 | Rapaport et al. |
| 8,564,684 B2 | 10/2013 | Bai |
| 8,597,031 B2 | 12/2013 | Cohen et al. |
| 8,762,356 B1 | 6/2014 | Kogan |
| 2002/0005784 A1 | 1/2002 | Balkin et al. |
| 2002/0188603 A1 * | 12/2002 | Baird ............... G06F 17/30637 |
| 2003/0041147 A1 | 2/2003 | van den Oord et al. |
| 2003/0160830 A1 | 8/2003 | DeGross |
| 2003/0179229 A1 | 9/2003 | Van Erlach et al. |
| 2004/0220925 A1 | 11/2004 | Liu et al. |
| 2004/0243415 A1 | 12/2004 | Commarford et al. |
| 2005/0144162 A1 | 6/2005 | Liang |
| 2005/0203738 A1 | 9/2005 | Hwang |
| 2005/0216253 A1 | 9/2005 | Brockett |
| 2006/0026147 A1 | 2/2006 | Cone et al. |
| 2006/0167857 A1 * | 7/2006 | Kraft ................. G06F 17/30528 |
| 2006/0190822 A1 | 8/2006 | Basson et al. |
| 2006/0204142 A1 | 9/2006 | West et al. |
| 2006/0206324 A1 | 9/2006 | Skilling et al. |
| 2006/0242608 A1 | 10/2006 | Garside et al. |
| 2006/0248074 A1 | 11/2006 | Carmel et al. |
| 2007/0016422 A1 | 1/2007 | Mori et al. |
| 2007/0033269 A1 | 2/2007 | Atkinson et al. |
| 2007/0050339 A1 * | 3/2007 | Kasperski ......... G06F 17/30967 |
| 2007/0052868 A1 | 3/2007 | Chou et al. |
| 2007/0088686 A1 * | 4/2007 | Hurst-Hiller ..... G06F 17/30395 |
| 2007/0089125 A1 | 4/2007 | Claassen |
| 2007/0124132 A1 | 5/2007 | Takeuchi |
| 2007/0150279 A1 | 6/2007 | Gandhi et al. |
| 2007/0162281 A1 | 7/2007 | Saitoh et al. |
| 2007/0167689 A1 | 7/2007 | Ramadas et al. |
| 2007/0192710 A1 | 8/2007 | Platz et al. |
| 2007/0208738 A1 * | 9/2007 | Morgan ............... G06F 17/271 |
| 2007/0213983 A1 | 9/2007 | Ramsey |
| 2007/0214164 A1 | 9/2007 | MacLennan et al. |
| 2007/0233692 A1 | 10/2007 | Lisa et al. |
| 2007/0255567 A1 | 11/2007 | Bangalore et al. |
| 2008/0046405 A1 | 2/2008 | Olds et al. |
| 2008/0167858 A1 | 7/2008 | Christie et al. |
| 2008/0171555 A1 | 7/2008 | Oh et al. |
| 2008/0189628 A1 | 8/2008 | Liesche et al. |
| 2008/0195645 A1 | 8/2008 | Lapstun et al. |
| 2008/0195980 A1 | 8/2008 | Morris |
| 2008/0208567 A1 | 8/2008 | Brockett et al. |
| 2008/0221893 A1 | 9/2008 | Kaiser |
| 2008/0288474 A1 | 11/2008 | Chin et al. |
| 2008/0294982 A1 | 11/2008 | Leung et al. |
| 2008/0312910 A1 | 12/2008 | Zhang |
| 2009/0002178 A1 | 1/2009 | Guday et al. |
| 2009/0043584 A1 | 2/2009 | Philips |
| 2009/0043741 A1 | 2/2009 | Kim |
| 2009/0077464 A1 | 3/2009 | Goldsmith et al. |
| 2009/0128567 A1 | 5/2009 | Shuster et al. |
| 2009/0154795 A1 | 6/2009 | Tan et al. |
| 2009/0187824 A1 | 7/2009 | Hinckley et al. |
| 2009/0210214 A1 * | 8/2009 | Qian ................. G06F 17/30669 704/2 |
| 2009/0216690 A1 * | 8/2009 | Badger ................. G06F 3/0237 706/11 |
| 2009/0222437 A1 | 9/2009 | Niu et al. |
| 2009/0313239 A1 | 12/2009 | Wen et al. |
| 2010/0005086 A1 * | 1/2010 | Wang ..................... G06F 3/018 707/E17.014 |
| 2010/0122155 A1 | 5/2010 | Monsarrat |
| 2010/0138210 A1 | 6/2010 | Seo et al. |
| 2010/0146407 A1 | 6/2010 | Bokor et al. |
| 2010/0169770 A1 | 7/2010 | Hong et al. |
| 2010/0180199 A1 * | 7/2010 | Wu ..................... G06F 17/278 715/259 |
| 2010/0217581 A1 * | 8/2010 | Hong ................. G06F 17/2223 704/3 |
| 2010/0217795 A1 | 8/2010 | Hong |
| 2010/0245251 A1 | 9/2010 | Yuan et al. |
| 2010/0251304 A1 | 9/2010 | Donoghue et al. |
| 2010/0306139 A1 | 12/2010 | Wu et al. |
| 2010/0306248 A1 | 12/2010 | Bao et al. |
| 2010/0309137 A1 | 12/2010 | Lee |
| 2011/0014952 A1 | 1/2011 | Minton |
| 2011/0041077 A1 | 2/2011 | Reiner |
| 2011/0060761 A1 | 3/2011 | Fouts |
| 2011/0066431 A1 | 3/2011 | Ju et al. |
| 2011/0087483 A1 | 4/2011 | Hsieh et al. |
| 2011/0107265 A1 | 5/2011 | Buchanan et al. |
| 2011/0131642 A1 | 6/2011 | Hamura et al. |
| 2011/0137635 A1 | 6/2011 | Chalabi et al. |
| 2011/0161080 A1 | 6/2011 | Ballinger et al. |
| 2011/0161311 A1 * | 6/2011 | Mishne ............. G06F 17/30864 707/719 |
| 2011/0173172 A1 | 7/2011 | Hong et al. |
| 2011/0178981 A1 | 7/2011 | Bowen et al. |
| 2011/0184723 A1 | 7/2011 | Huang et al. |
| 2011/0188756 A1 | 8/2011 | Lee et al. |
| 2011/0191321 A1 * | 8/2011 | Gade ..................... G06F 12/08 707/709 |
| 2011/0202876 A1 | 8/2011 | Badger et al. |
| 2011/0258535 A1 | 10/2011 | Adler, III et al. |
| 2011/0289105 A1 | 11/2011 | Hershowitz |
| 2011/0296324 A1 | 12/2011 | Goossens et al. |
| 2012/0016678 A1 * | 1/2012 | Gruber ............... G06F 17/3087 704/275 |
| 2012/0019446 A1 * | 1/2012 | Wu ....................... G06F 3/018 345/168 |
| 2012/0023103 A1 | 1/2012 | Soderberg et al. |
| 2012/0029902 A1 | 2/2012 | Lu et al. |
| 2012/0035932 A1 * | 2/2012 | Jitkoff ............... G01C 21/3608 704/254 |

(56) References Cited

U.S. PATENT DOCUMENTS

| | | | |
|---|---|---|---|
| 2012/0036468 A1* | 2/2012 | Colley | G06F 3/0418 715/773 |
| 2012/0041752 A1 | 2/2012 | Wang et al. | |
| 2012/0060113 A1 | 3/2012 | Sejnoha et al. | |
| 2012/0060147 A1 | 3/2012 | Hong et al. | |
| 2012/0078611 A1 | 3/2012 | Soltani et al. | |
| 2012/0113011 A1* | 5/2012 | Wu | G06F 3/018 345/169 |
| 2012/0117506 A1 | 5/2012 | Koch et al. | |
| 2012/0143897 A1 | 6/2012 | Wei et al. | |
| 2012/0173222 A1 | 7/2012 | Wang et al. | |
| 2012/0222056 A1 | 8/2012 | Donoghue et al. | |
| 2012/0297294 A1 | 11/2012 | Scott et al. | |
| 2012/0297332 A1 | 11/2012 | Changuion et al. | |
| 2013/0016113 A1 | 1/2013 | Adhikari et al. | |
| 2013/0054617 A1 | 2/2013 | Colman | |
| 2013/0091409 A1* | 4/2013 | Jeffery | G06F 17/30056 715/202 |
| 2013/0132359 A1* | 5/2013 | Lee | G06F 17/30867 707/706 |
| 2013/0159920 A1 | 6/2013 | Scott et al. | |
| 2013/0298030 A1 | 11/2013 | Nahumi et al. | |
| 2013/0346872 A1 | 12/2013 | Scott et al. | |
| 2014/0040238 A1 | 2/2014 | Scott et al. | |
| 2015/0106702 A1 | 4/2015 | Scott et al. | |
| 2015/0121291 A1 | 4/2015 | Scott et al. | |
| 2015/0161126 A1 | 6/2015 | Wang et al. | |

FOREIGN PATENT DOCUMENTS

| | | |
|---|---|---|
| CN | 101661474 | 3/2010 |
| CN | 102314441 | 1/2012 |
| WO | WO 2010105440 A1 * | 9/2010 |

OTHER PUBLICATIONS

Komasu et al., "Corpus-based Predictive Text Input," Proceedings of the Third International Conference on Active Media Technology, May 2005, 6 pages.
"Microsoft Research ESL Assistant," retrieved at <<http://www.eslassistant.com/>>, retrieved date Feb. 3, 2011, 1 page.
Suzuki et al., "A Comparative Study on Language Model Adaptation Techniques using New Evaluation Metrics," Proceedings: HLT/EMNLP, Vancouver, Oct. 6-8, 2005, retrieved at <<http://www.aclweb.org/anthology/H/H05/H05-1034.pdf>>, 8 pages.
Komasu et al., "Corpus-based Predictive Text Input", Proceedings of the Third International Conference on Active Media Technology, May 2005, 6 pages.
Office Action for U.S. Appl. No. 13/109,021, mailed on Mar. 11, 2014, Dyer, A.R., "Network Search for Writing Assistance," 18 pages.
Office action for U.S. Appl. No. 13/315,047, mailed on Apr. 24, 2014, Liu et al., "Sentiment Aware User Interface Customization", 13 pages.
Office action for U.S. Appl. No. 12/693,316, mailed on May 19, 2014, Huang et al., "Phonetic Suggestion Engine", 22 pages.
Office Action for U.S. Appl. No. 13/109,021, mailed on Jun. 19, 2014, Dyer, A.R., "Network Search for Writing Assistance," 42 pages.
"Prose", Dictionary.com, Jun. 19, 2014, 2 pgs.
Damper, "Self-Learning and Connectionist Approaches to Text-Phoneme Conversion", retrieved on May 26, 2010 at <<ftp://ftp.cogsci.ed.ac.uk/pub/joe/newbull.ps>>, UCL Press, Connectionist Models of Memory and Language, 1995, pp. 117-144.
"Database", Microsoft Computer Dictionary, Fifth Edition, retrieved on May 13, 2011, at <<http://academic.safaribooksonline.com/book/communications/0735614954>>, Microsoft Press, May 1, 2002, 2 pages.
"File", Microsoft Computer Dictionary, Fifth Edition, retrieved on May 13, 2011, at <<http://academic.safaribooksonline.com/book/communications/0735614954>>, Microsoft Press, May 1, 2002, 2 pages.

Office action for U.S. Appl. No. 12/693,316, mailed on Oct. 30, 2013, Huang, et al., "Phonetic Suggestion Engine", 24 pages.
Office action for U.S. Appl. No. 12/693,316, mailed on Jun. 19, 2013, Huang et al., "Phonetic Suggestion Engine", 20 pages.
Wikipedia, "Soundex", retrieved on Jan. 20, 2010 at http://en.wikipedia.org/wiki/soundex, 3 pgs.
Office Action for U.S. Appl. No. 13/109,021, mailed on Aug. 21, 2012, Scott et al., "Network Search for Writing Assistance", 19 pages.
Final Office Action for U.S. Appl. No. 13/109,021, mailed on Jan. 11, 2013, Scott et al., "Network Search for Writing Assistance", 16 pages.
Office Action for U.S. Appl. No. 13/109,021, mailed on Sep. 25, 2013, Scott et al., "Network Search for Writing Assistance", 18 pages.
Office action for U.S. Appl. No. 13/567,305, mailed on Jan. 30, 2014, Scott, et al., "Business Intelligent in Document Suggestions", 14 pages.
Office action for U.S. Appl. No. 13/315,047, mailed on Feb. 12, 2014, Liu, et al., "Sentiment Aware User Interface Customization", 14 pages.
International Search Report & Written Opinion for PCT Patent Application No. PCT/US2013/053321, Mailed Date: Oct. 1, 2013, Filed Date: Aug. 2, 2013, 9 Pages.
U.S. Appl. No. 13/331,023, filed Dec. 20, 2011,Tony Hou, Weipeng Liu, Weijiang Xu, and Xi Chen, "Scenario-Adaptive Input Method Editor," 57 pages.
Wikipedia, "Selection Based Search", retrieved Mar. 23, 2012 at http://en.wikipedia.org/wiki/Selection based search, 3 pgs.
Millward, Steven, "Baidu Japan Acquires Simeji Mobile App Team, for added Japanese Typing fun," Published Dec. 13, 2011.
Ciccolini, "Baidu IME More Literate in Chinese Input," Published Sep. 15, 2011, http://www.itnews-blog.com/it/81630.html, 4 pgs.
Suematsu et al., "Network-Based Context-Aware Input Method Editor," Proceedings: Sixth International Conference on Networking and Services (ICNS), Mar. 7, 2010, retrieved at http://ieeexplore.ieee.org/stamp/stamp.jsp?tp=&arnumber=5460679, pp. 1-6.
Lenssen, Philipp, "Google Releases Pinyin Converter," Published Apr. 4, 2007 http://blogoscoped.com/archive/2007-04-04-n49.html.
Kumar, "Google launched Input Method editor—type anywhere in your language", retrieved at http://shoutingwords.com/google-launched-input-method-editor.html, Mar. 2010, 12 pages.
Lenssen, "Google Releases Pinyin Converter", Retrieved at http://blogoscoped.com/archive/2007-04-04-n49.htm, Apr. 4, 2007, 3 pages.
Lo, et al., "Cross platform CJK input Method Engine," IEEE International Conference on Systems, Man and Cybernetics, Oct. 6, 2002, retrieved at http://ieeexplore.ieee.org/stamp/stamp.jsp?tp=&arnumber=1175680, pp. 1-6.
Millward, "Baidu Japan Acquires Simeji Mobile App Team, for Added Japanese Typing Fun", retrieved from http://www.techinasia.com/baidu-japan-simeiji/, Dec. 13, 2011, 3 pages.
Windows XP Chinese Pinyin Setup, published Apr. 15, 2006, retrieved at http://www.pinyinjoe.com/pinyin/pinyin_setup.htm, pp. 1-10.
Mohan et al., "Input Method Configuration Overview," Jun. 3, 2011, retrieved at http://gameware.autodesk.com/documents/gfx_4.0_ime.pdf, pp. 1-9.
Scott, et al., "Engkoo: Mining theWeb for Language Learning", In Proceedings of the 49th Annual Meeting of the Association for Computational Linguistics: Human Language Technologies: Systems Demonstrations, Jun. 21, 2011, 6 pages.
"Search Engine", Microsoft Computer Dictionary, Mar. 2002, Fifth Edition, pp. 589.
Sowmya, et al., "Transliteration Based Text Input Methods for Telugu", http://content.imamu.edu.sa/Scholars/it/VisualBasic/2009_53.pdf, Proceedings of 22nd International Conference on Computer Processing of Oriental Languages. Language Technology for the Knowledge-based Economy (ICCPOL), Mar. 2009, pp. 122-132.
U.S. Appl. No. 13/331,023, filed Dec. 20, 2011,Tony Hou, Weipeng Liu, Weijiang Xu, and Xi Chen, "Scenario-Adaptive Input Method Editor," 57 pages.

(56) References Cited

OTHER PUBLICATIONS

Ciccolini, "Baidu IME More literate in Chinese input," Published Sep. 15, 2011, <<http://www.itnews-blog.com/it/81630.html>>, 4 pages.
Millward, "Baidu Japan Acquires Simeji Mobile App Team, for added Japanese Typing fun," Published Dec. 13, 2011, 3 pages.
"Google launched Input Method editor—type anywhere in your language," published Mar. 2, 2010, retrieved at <<http://shoutingwords.com/google-launched-input-method-editor.html>>, 12 pages.
Lenssen, "Google Releases Pinyin Converter," Published Apr. 4, 2007 <<http://blogoscoped.com/archive/2007-04-04-n49.html>>, 3 pages.
Google Transliteration Input Method (IME) Configuration, published Feb. 5, 2010, retrieved at <<http://www.technicstoday.com/2010/02/google-transliteration-input-method-ime-configuration/>>, pp. 1-13.
Lo et al., "Cross platform CJK input Method Engine," IEEE International Conference on Systems, Man and Cybernetics, Oct. 6, 2002, retrieved at <<http://ieeexplore.ieee.org/stamp/stamp.jsp?tp=&arnumber=1175680>>, pp. 1-6.
Mohan et al., "Input Method Configuration Overview," Jun. 3, 2011, retrieved at <<http://gameware.autodesk.com/documents/gfx_4.0_ime.pdf>>, pp. 1-9.
Scott et al., "Engkoo: Mining theWeb for Language Learning," In Proceedings of the 49th Annual Meeting of the Association for Computational Linguistics: Human Language Technologies: Systems Demonstrations, Jun. 21, 2011, 6 pages.
Sowmya et al., "Transliteration Based Text Input Methods for Telugu," <<http://content.imamu.edu.sa/Scholars/it/VisualBasic/2009_53.pdf>>, Proceedings of 22nd International Conference on Computer Processing of Oriental Languages. Language Technology for the Knowledge-based Economy (ICCPOL), Mar. 2009, pp. 122-132.
Suematsu et al., "Network-Based Context-Aware Input Method Editor," Proceedings: Sixth International Conference on Networking and Services (ICNS), Mar. 7, 2010, retrieved at <<http://ieeexplore.ieee.org/stamp/stamp.jsp? tp=&arnumber=5460679>>, pp. 1-6.
Windows XP Chinese Pinyin Setup, published Apr. 15, 2006, retrieved at <<http://www.pinyinjoe.com/pinyin/pinyin_setup.htm>>, pp. 1-10.
U.S. Appl. No. 13/63,5219, filed Sep. 14, 2011, Scott, et al., "Cross-Lingual Input Method Editor".
Engkoo Pinyin Redefines Chinese Input, Published on: May 13, 2013, Available at: <<http://research.microsoft.com/en-us/news/features/engkoopinyinime-051313.aspx>>.
"English Assistant", Published on: Apr. 19, 2013, Available at: <<http://bing.msn.cn/pinyin/>>.
"Innovative Chinese Engine", Published on: May 2, 2013, Available at: <<http://bing.msn.cn/pinyin/help.shtml>>.
"Input Method (IME)", Retrieved on: Jul. 3, 2013, Available at: <<http://www.google.co.in/inputtools/cloud/features/input-method.html>>.
Dinamik-Bot, et al., "Input method", retrieved on May 6, 2015 at <<http://en.wikipedia.org/w/index.php?title=Input_method&oldid=496631911, Wikipedia, the free encyclopedia, Jun. 8, 2012, 4 pages.
"Engkoo Pinyin Redefines Chinese Input", Published on: May 13, 2013, available at <<http://research.microsoft.com/en-us/news/features/engkoopinyinime-051313.aspx>>, 3 pages.
"English Assistant", Published on: Apr. 19, 2013, available at <<http://bing.msn.cn/pinyin/>>, 2 pages.
European Office Action mailed Jun. 18, 2015 for European patent application No. 12879676.0, a counterpart foreign application of U.S. Appl. No. 13/635,306, 5 pages.
Supplementary European Search Report mailed May 20, 2015 for European Patent Application No. 12879676.0, 3 pages.
Supplemenary European Search Report mailed Jul. 16, 2015 for European patent application No. 12880149.5, 5 pages.
Supplemenary European Search Report mailed Sep. 14, 2015 for European patent application No. 12879804.8, 5 pages.
"Innovative Chinese Engine", Published on: May 2, 2013, available at <<http://bing.msn.cn/pinyin/help.shtml>>, 6 pages.
"Input Method (IME)", Retrieved on: Jul. 3, 2013, available at <<http://www.google.co.in/inputtools/cloud/features/input-method.html>>, 6 pages.
International Search Report & Written Opinion for PCT Patent Application No. PCT/CN2013/081156, mailed May 5, 2014; filed Aug. 9, 2013, 14 pages.
Miessler, "7 Essential Firefox Quicksearches", Retrieved from <<https:danielmiessler.com/blog/7-essential-firefox-quicksearches/>>, Published Aug. 19, 2007, 2 pages.
Office action for U.S. Appl. No. 13/586,267, mailed on Jan. 2, 2015, Scott et al., "Input Method Editor Application Platform", 19 pages.
Office action for U.S. Appl. No. 12/693,316, mailed on Oct. 16, 2014, Huang, et al., "Phonetic Suggestion Engine", 24 pages.
Office action for U.S. Appl. No. 13/315,047, mailed on Oct. 2, 2014, Weipeng Liu, "Sentiment Aware User Interface Customization", 12 pages.
Office action for U.S. Appl. No. 13/635,219, mailed on Mar. 13, 2015, Scott et al., "Cross-Lingual Input Method Editor", 21 pages.
Office action for U.S. Appl. No. 13/635,306, mailed on Mar. 27, 2015, Scott et al., "Input Method Editor", 18 pages.
Office action for U.S. Appl. No. 13/315,047, mailed on Apr. 28, 2015, Liu et al., "Sentiment Aware User Interface Customization", 12 pages.
Office action for U.S. Appl. No. 13/701,008, mailed on May 12, 2015, Wang et al., "Feature-Based Candidate Selection", 12 pages.
Office action for U.S. Appl. No. 13/586,267, mailed on May 8, 2015, Scott et al., "Input Method Editor Application Platform", 18 pages.
Office action for U.S. Appl. No. 13/701,008, mailed on Jun. 15, 2015, Wang et al., "Feature-Based Candidate Selection", 17 pages.
Office action for U.S. Appl. No. 13/586,267, mailed on Jul. 31, 2014, Scott et al., "Input Method Editor Application Platform", 20 pages.
Office action for U.S. Appl. No. 13/635,306, mailed on Aug. 14, 2015, Scott et al., "Input Method Editor", 26 pages.
Office action for U.S. Appl. No. 13/109,021, mailed on Sep. 30, 2014, Dyer, A.R., "Network Search for Writing Assistance", 17 pages.
PCT International Preliminary Report on Patentability mailed Mar. 12, 2015 for PCT Application No. PCT/CN2012/080749, 8 pages.
Ben-Haim, et al., "Improving Web-based Image Search via Content Based Clustering", Proceedings of the 2006 Conference on Computer Vision and Pattern Recognition Workshop (CVPRW '06), IEEE, Jun. 17, 2006, 6 pages.
Berg, et al., "Animals on the Web", Proceedings of the 2006 IEEE Computer Society Conference on Computer Vision and Pattern Recognition (CVPR '06), vol. 2, IEEE, Jun. 17, 2006, pp. 1463-1470.
European Office Action mailed Oct. 8, 2015 for European patent application No. 12879804.8, a counterpart foreign application of U.S. Appl. No. 13/586,267, 9 pages.
Partial Supplemenary European Search Report mailed Oct. 26, 2015 for European patent application No. 12883902.4, 7 pages.
The Supplementary European Search Report mailed Nov. 12, 2015 for European patent application No. 12880149.5, 7 pages.
Guo et al., "NaXi Pictographs Input Method and WEFT", Journal of Computers, vol. 5, No. 1, Jan. 2010, pp. 117-124.
Office action for U.S. Appl. No. 13/586,267 mailed on Nov. 6, 2015, Scott et al., "Input Method Editor Application Platform", 22 pages
Office action for U.S. Appl. No. 13/315,047, mailed on Sep. 24, 2015, Liu et al., "Sentiment Aware User Interface Customization", 12 pages.
Office action for U.S. Appl. No. 13/635,219, mailed on Sep. 29, 2015, Scott et al., "Cross-Lingual Input Method Editor", 14 page.
European Office Action mailed Nov. 27, 2015 for European patent application No. 128801495, a counterpart foreign application of U.S. Appl. No. 13/635,219, 10 pages.
European Search Report mailed Feburary 18, 2016 for European patent application No. 12883902.4, 7 pages.

* cited by examiner

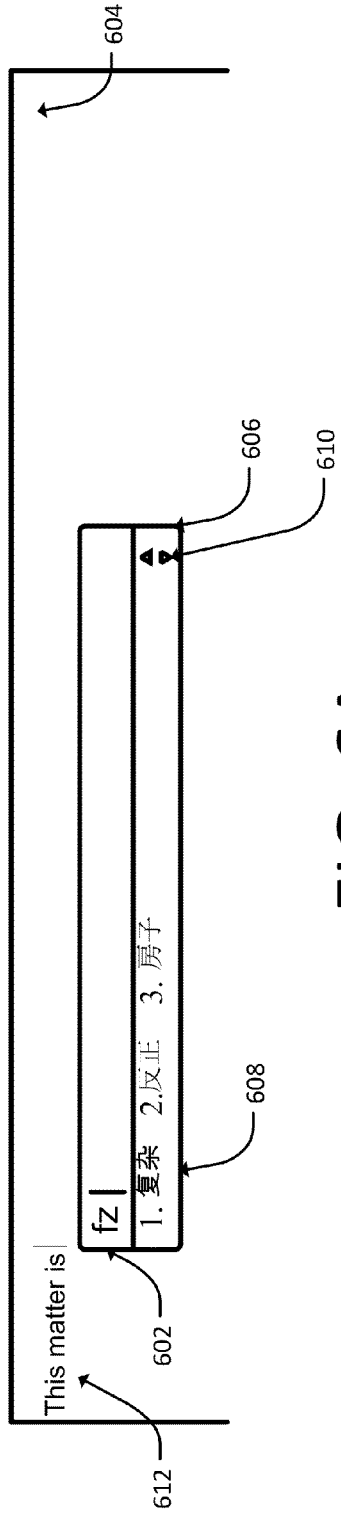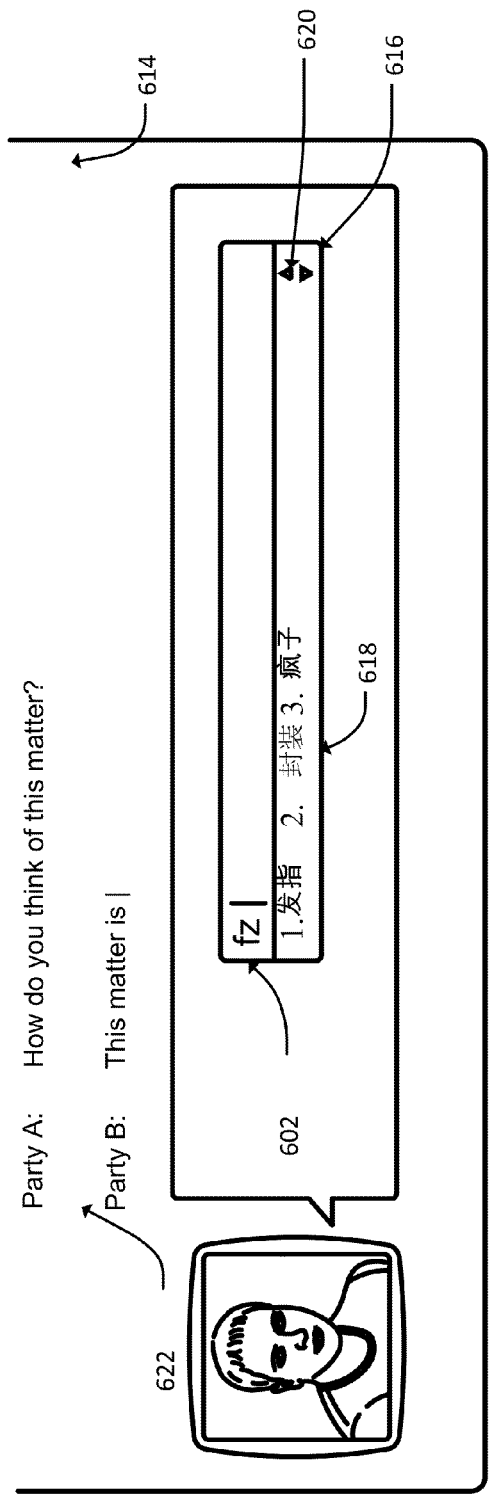
FIG. 6A
FIG. 6B

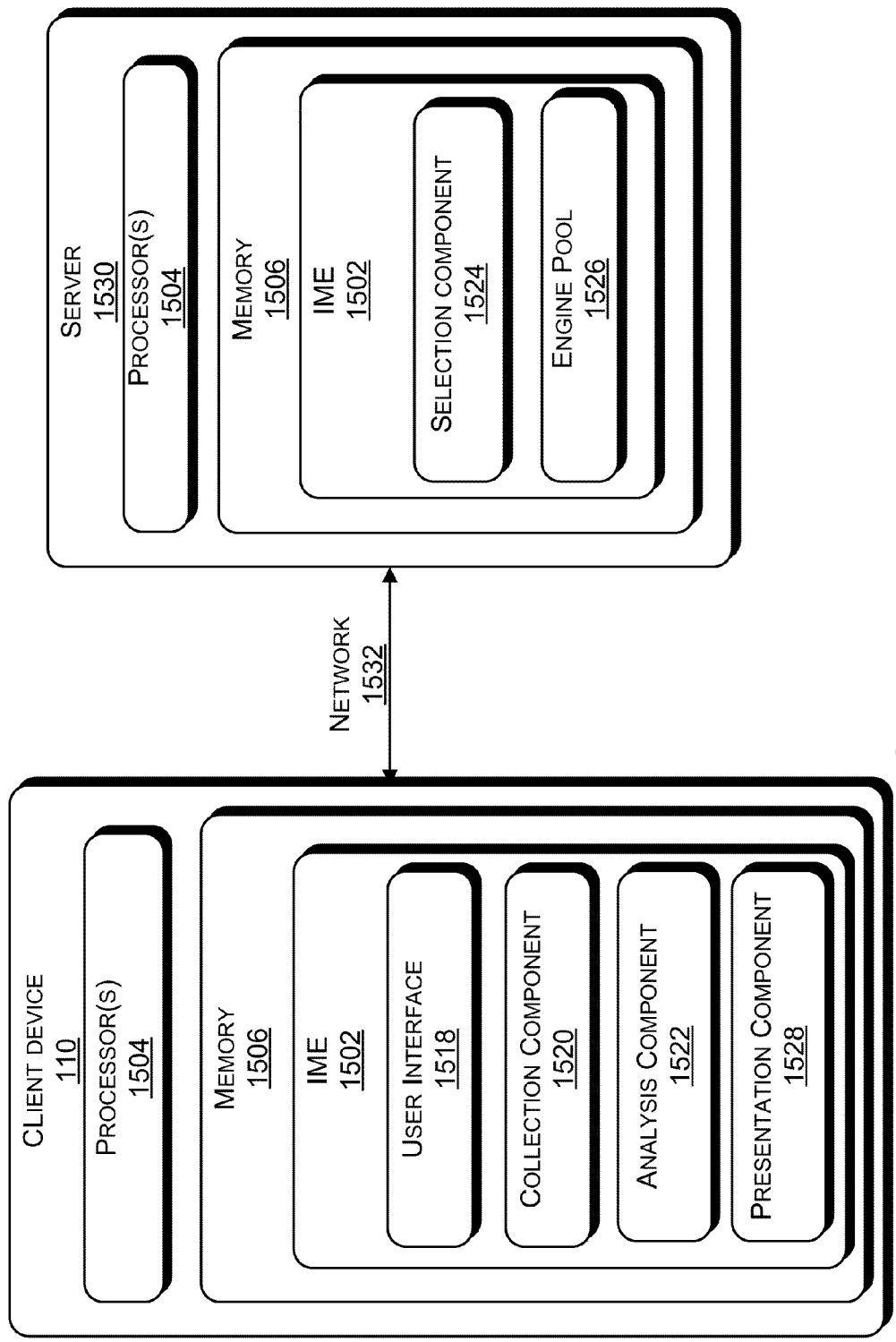

SCENARIO-ADAPTIVE INPUT METHOD EDITOR

BACKGROUND

An input method editor (IME) is a computer application that assists a user to input texts at a computing device. An IME may provide several input candidates based on received inputs from the user. The inputs and the provided texts may be the same language or different languages.

For example, the user may input one or more initial English characters of a word or phrase and an IME, based on the initial characters, provides one or more complete words or phrases for the user to select a proper one.

For another example, an IME may also assist the user to input non-Latin characters such as Chinese. The user may input Latin characters through a keyboard. The Latin characters may be a spelling of the Chinese characters. The IME returns one or more Chinese characters based on the spelling to the user to select a proper one. As the current keyboard usually only supports inputting Latin characters, the IME is useful for the user to input non-Latin characters.

The input candidate selected by the user can be inserted into various other computer applications, such as a chatting application, a document editing application, a gaming application, etc.

Typically, an IME only provides input candidates in the form of text, and a single source is typically used to identify the input candidates, regardless of the type of application with which the IME is being used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the present disclosure.

An input method editor (IME) as described herein provides input candidates to a user to input into another computer application at least partly based on a scenario of the user input and the queries input by the user. The scenario of the user input may include a scenario of the computer application (e.g., chatting or emailing) and, in some embodiments, a context of the user input (e.g., a prior use history of the computing application such as chatting history).

The IME may not only provide text candidates but also rich candidates. The IME may also determine the type of input candidates, i.e. text candidates, rich candidates, or both, to be presented to the user. In one embodiment, the IME may host an engine pool including a plurality of scenario-tuned and type-specific input candidate engines, such as a chat-tuned text candidate engine and a chat-tuned rich candidate engine. The IME may use one of such specific engines to search input candidates based on the determined scenario of the user input and the type of input candidates. The engine pool may be hosted at a remote server.

The IME ranks the input candidates at least partly based on their relevancies to the scenario of the user input and presents the text candidates and/or rich candidates at one interface of the IME.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 6A and FIG. 6B illustrate how text candidates are adapted to different scenarios when the queries are the same.

FIG. 15A and FIG. 15B illustrate example configurations of an IME.

DETAILED DESCRIPTION

Overview

Figure 1:
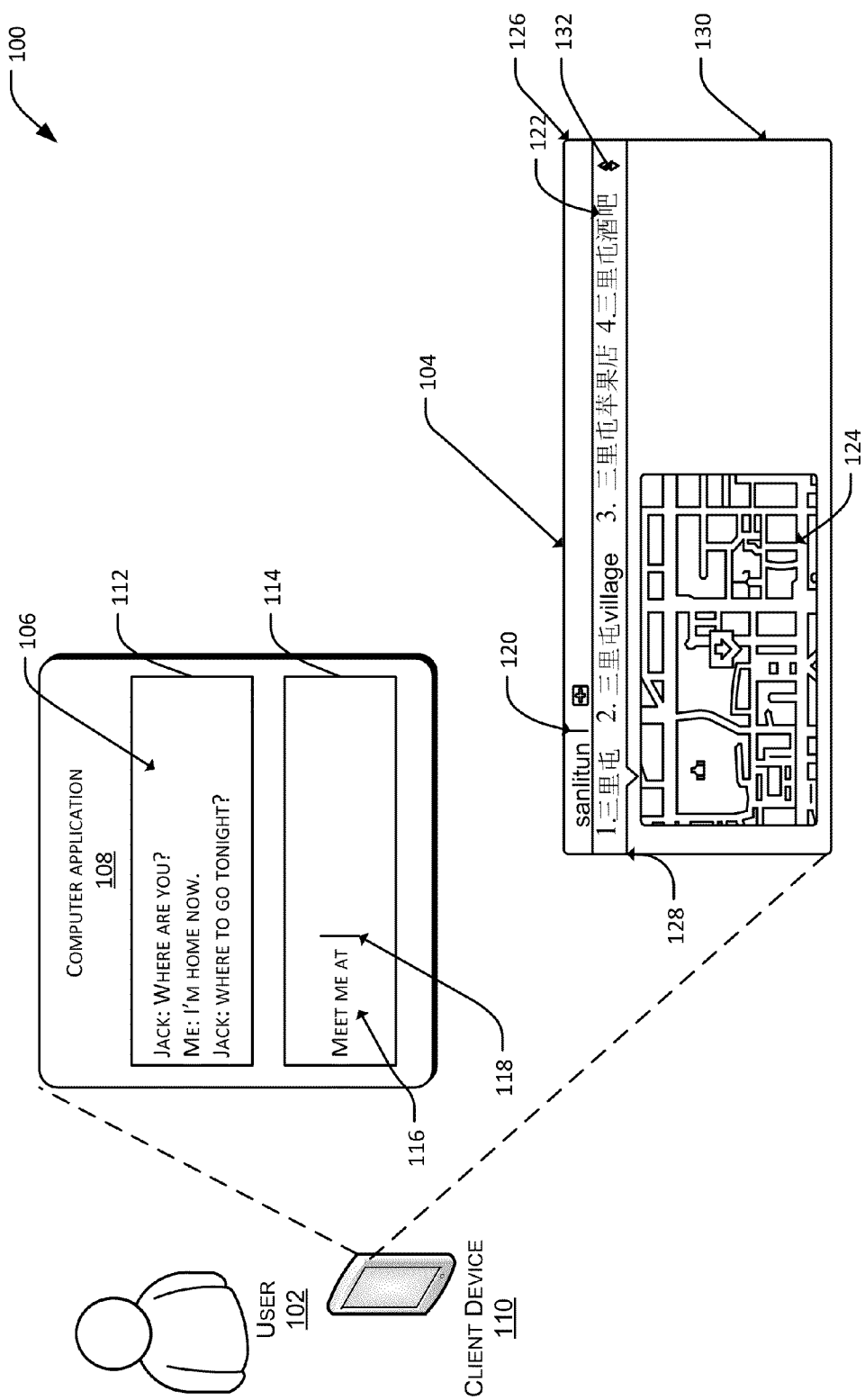
FIG. 1 illustrates an example overview of providing scenario-adaptive text and/or rich candidates in an example chatting scenario.

The disclosed techniques describe an input method editor (IME) that provides input candidates to a user to input into a computer application at least partly based on a scenario of the user input and the queries input by the user. The input candidates may include not only text candidates such as non-Lain characters such as Chinese, Latin characters such as English, but also rich candidates such as multimedia to provide supplemental information to a user to enhance the user experience.

The queries are one or more texts such as characters or symbols input by the user. The queries may represent one or more expressions. For example, a query may be a series of initial characters, an abbreviation, a spelling, and/or a translation of one or more words or phrases. The queries and the expressions represented by the queries, such as words or phrases, may be in the same or different languages. The user may input the queries through a variety of input methods such as a keyboard input, a voice input, and a touch screen input.

The text candidates are the expressions represented by the queries in the form of text. The rich candidates are the expressions represented by the queries in forms other than text such as images and multimedia.

The scenario of the user input may include a scenario of the computer application (e.g., chatting or emailing). The scenario of the user input may also include a context of the user input (e.g., a prior use history of the computing application such as chatting history or contents displayed at the user interface of the computer application such as the user's prior inputs).

There may be many input candidates corresponding to the same query. The ranking of the input candidates may be different in different scenarios of the user input. There is also a different preference of type of candidates in the different scenarios of the user input. In one embodiment, the IME may provide rich candidates in some predefined scenarios of the user input (such as emailing or chatting) and not provide rich candidates in some predefined scenarios of the user input (such as document editing). In another embodiment, the IME may provide rich candidates when the probability that the rich candidates improve user experiences is calculated beyond a predefined threshold.

The IME may determine the type of input candidates to be presented to the user at least partly based on the scenario of the user input. The presented type of input candidates may be text candidates, rich candidates, both, or none.

After determining the scenario of the user input, the type of input candidates, and the queries, the IME selects a proper scenario-specific and type-specific input candidate engine to generate or identify the input candidates. Usually when the input candidates are already available at a database or a network, the proper engine is selected to identify the input candidates. Sometimes, the input candidates are not available at the database or the network, such as a rich candidate showing a map of a user's current location to a desired location. Such rich candidate may be generated by the proper input candidate engine.

The input candidates may also be ranked according to their relevancies to the scenario of the user input. In one example, such ranking may be accomplished by the input candidate engine when it provides the input candidates.

The IME is capable to present both text candidates and rich candidates at a user interface of the IME. For example, the user interface of the IME may include a web browser component capable for HTML5 rendering.

There may be various configurations of the IME to identify the input candidates. In one embodiment, the IME has an engine pool that includes a plurality of preset engines that are each capable to produce scenario-specific text or rich candidates. For example, a preset scenario-tuned text candidate engine, such as a chatting-tuned text candidate engine, may be preset with language models and lexicons tied to the chatting scenario to identify the text candidates suitable in the chatting scenario. The preset scenario-tuned rich candidate engine may use web services to identify or generate the rich candidates. The web services may include, for example, web search, video search, image search, dictionary and encyclopedia search, address book information such as from Microsoft Exchange Server, and/or information from social networking web services.

In another embodiment, one engine may provide both text candidates and rich candidates. For example, the engine may not be preset for the specific scenario but may be adjusted to the specific scenario at real-time after identification of the scenario.

There may also be various configurations for the deployment of the IME. In one embodiment, all components of the IME are located at a client device. In another embodiment, the IME is implemented in a client-server architecture in which some components are located at the client device and some components are located at the remote server relative to the client device. For example, the engine pool may be located at the remote server, and the user interface of the IME may be located at the client device.

FIG. 1 illustrates an example overview 100 of providing scenario-adaptive text and/or rich candidates in an example chatting scenario.

A user 102, via a user interface 104 of an input method editor (IME), inputs one or more objects 106 into a user interface of a computer application 108. Both the user interface 104 of the IME and the user interface of the computer application 108 present at a user interface of a client device 110 at a same time. There may be two or more computer applications (not shown in FIG. 1) opened at the user interface of the client device 110. The user 102 may select the computer application 108 that receives the objects 106 by using a mouse or other inputting methods.

In the example of FIG. 1, the computer application 108 is a chatting application such as Microsoft MSN®. The user interface of the computer application 108 includes two windows, a chatting window 112 and an input window 114. The chatting window 112 displays the objects 106 which are already input into the user interface of the computer application 108. The objects 106 include text and/or rich objects. In the example of FIG. 1, the objects are text objects "Jack: Where are you? Me: I'm home now. Jack: where to go tonight?" Jack is a user name of the opposing party that is chatting with the user 102. Me is a representation of the user 102.

The input window 114 includes input objects 116 that are to be input as the objects into the chatting window 112. In the example of FIG. 1, the input objects 116 are text objects "meet me at." An input indication 118, represented by "|," represents an indication to insert the input candidates. The input indication 118 may be, for example, a focus of a mouse to input a next input object 116. The input indication 118 also indicates that the computer application 108 that contains the input indication 118 among many other running computer applications (not shown in FIG. 1) is the one that receives input objects 116 from the IME.

The user 102 may use the user interface 104 of the IME to input the input objects 116. In the example of FIG. 1, the user 102 inputs one or more queries 120 into the user interface 104 of the IME. The IME returns one or more input candidates including one or more text candidates 122 and/or one or more rich candidates 124 at least partly based on the scenario of the user input. The user 102 may then select one or more input candidates from the text candidates 122 and/or rich candidates 124 as the input objects 116.

The query 120 and the text candidates 122 may be any kind of text such as Latin characters (e.g. English), non-Latin characters (e.g. Chinese), symbols, numbers, or a mix of different kinds of texts. The query 120 and the text candidates 122 may be the same language or different languages. For example, the query 120 may represent a series of initial characters, an abbreviation, a spelling, and/or a translation of the text candidates 122.

The rich candidates 124 may include pictures, maps, videos, and/or other forms of representations in addition to texts. The rich candidates 124 may include, for example, pictures, maps, videos, or other forms of representations that provide supplemental information to the user 102 in addition to the text candidates 122.

To assist in determining the input candidates to present, the IME may collect data relating to the scenario of the user input. For example, the scenario of the user input includes the scenario of the computer application 108, i.e. chatting in FIG. 1. The collected data may include, for example, a name of the computer application 108. The scenario of the user may also include a context of the user input such as the objects 106 already displayed on the chatting window 112 of the computer application 108 and the input objects 116, displayed at the input window 114, to be input into the chatting window 112.

The IME may also determine a type of candidates to be presented, i.e., the text candidates 122, the rich candidates 124, both, or none, at least partly based on the scenario of the user input. The IME then selects one or more input candidate engines (not shown in FIG. 1) that are capable to produce scenario-specific and type-specific (i.e. text-specific and/or rich-specific) input candidates.

The selection and ranking of the text candidates 122 and/or the rich candidates 124 may be based on their relevancies to the scenario of the user input. For example, the text candidates 122 or rich candidates 124 with higher relativity with the scenario of the computer application 108 may be ranked with a higher priority to be presented to the user 102.

In the example of FIG. 1, the user interface 104 of the IME includes a query window 126, a text candidate window 128, and/or a rich candidate window 130. The query window 126 receives one or more queries 120 from the user 102 through various inputting techniques, such as a keyboard, a touch screen, or voice inputs.

The query 120 in the example of FIG. 1 is the English characters "Sanlitun," which represent a spelling of Chinese characters "三里屯." In another embodiment, the query 120 may directly show the Chinese characters "里屯三." For instance, the user 102 may speak "Sanlitun" into the client device 110 and the IME directly identifies it as the English spelling of Chinese characters "三里屯" and presents the Chinese characters "三里屯" at the input window 114.

The text candidate window 128 displays the identified text candidates 122. In the example of FIG. 1, the text candidates 122 include a first text candidate "三里屯," a second text candidate "三里屯village," a third text candidate "三里屯苹果店," and a fourth text candidate "三里屯酒吧." The text candidates 122 are Chinese characters and a mix of Chinese and English characters corresponding to the query 120. The text candidates 122 include not only the first Chinese text candidate "三里屯," which is the Chinese expression of the spelling "Sanlitun," but also other text candidates such as the second text candidates that include more text information such as "三里屯villagelso" "三里屯, 苹果店" and "三里屯酒吧" that may provide more supplemental information to enhance the user experience. The text candidates 122 are identified at least partly based on the scenario of the computer application 108 and the query 120.

The text candidate window 128 may display more text candidates 122 if the user 102 clicks the button 132 for more text candidates 122.

The rich candidate window 130 displays the identified or generated rich candidates 124. In the example of FIG. 1, based on the collected data such as the user's input objects 116 "Meet me at," the IME determines that the query 120 "Sanlitun" may refer to a location, and the IME may use web services to identify the rich candidate 124 which is a map of "三里屯." Based on the collected data, the rich candidates 124 may also include a map from the user's current location to "三里屯" (not shown in FIG. 1).

IN one embodiment, the web services are online services, such as Bing® map, that do not require a registration of the user 102 to use. The IMT may directly use the query 120 and/or determined scenario of user input as input parameters to request the web service to return the rich candidates 124. In another embodiment, the web service (not shown in FIG. 1) may be online service that require the registrations of the user 102 to use, such as Facebook®, or requires the registration of the user 102 to provide more functionality based on prior saved user preference, historic data, etc. The IME may pre-store the authentication credentials of the user 102 to log onto and use such web service.

The user 102 may select one or more of the text candidates 122 and/or the rich candidates 124 as the input objects 116 to be inserted at the input indication 118.

Example methods for performing techniques described herein are discussed in detail below. These example methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote memories.

The example methods are sometimes illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer executable instructions that, when executed by one or more processors, perform the recited operations.

Example Techniques for Generating Input Candidates

Figure 2:
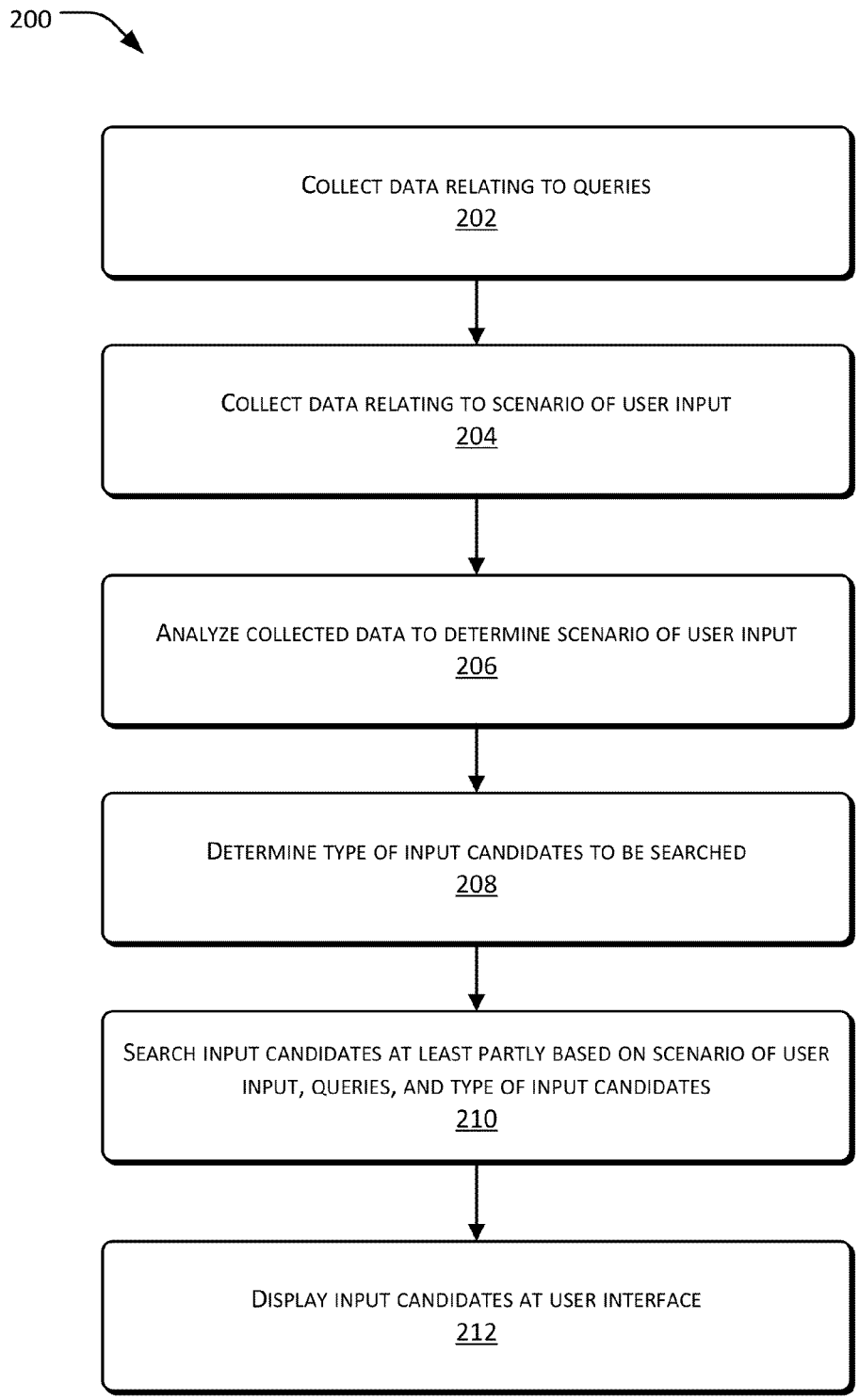
FIG. 2 illustrates a flowchart of an example method for identifying input candidates.

FIG. 2 illustrates a flowchart of example method 200 for identifying and/or generating the input candidates. At 202, data relating to the query 120 are collected. For example, if the user 102 inputs one or more characters "Sanlitun" into the query window 126. The "Sanlitun" is identified as a query 120 to be collected to search for matching text candidates 122 and/or rich candidates 124.

At 204, data relating to a scenario of the user input are collected. In various embodiments, the IME may collect different data relating to the scenario of the user input from one or more sources. For example, the IME may identify the computer application 108 that receives the input objects 116 among multiple computer applications opened at the interface of the client device 110. The IME may, for example, check the input indication 118 to identify the computer application 108.

After identification of the computer application 108 to receive the input objects 116, the IME may collect data relating to the scenario of the computer application 108, such as the name and version of the computer application 108. In the example of FIG. 1, the name of the computer application 108 is Microsoft MSN®, and the version of the computer application 106 is MSN Messenger 7.5 for Windows XP®.

The IME may also capture current contents displayed at the user interface of the computer application 108, such as the objects 106 in the chatting window 112 and the input objects 116 at the input window 114. For example, the IME may use screen pixel information based on visual understanding techniques such as OCR to identify the displayed contents. In the example of FIG. 1, the IME may capture the chatting displayed at the interface of the computer application 108, such as "Jack, where are you? Me: I am home now. Jack: where to go tonight?"

The IME may also collect a previous user history of using the computer application 108. Such user history may be stored locally or remotely, and may be helpful to analyze the context of the recent inputs. For example, when the computer application 108 is Microsoft MSN®, the user history may be a chatting history of the user.

At 206, the collected data are analyzed to determine the scenario of the user input. There are various techniques to determine the scenario. For example, the name of the computer application may be compared to a list of scenarios. The list of scenarios stores the corresponding relationships between the computer applications and scenarios. For instance, the list may indicate that the computer application Microsoft MSN® corresponds to the scenario of chatting, and the computer application Microsoft Word® corresponds to the scenario of document editing. Such list of scenarios may be updated periodically to include the corresponding relationships with new computer applications and to update the corresponding relationships.

The contents displayed at the user interface of the computer application 108 and the previous user history may also be used to identify the scenario of the computer application 108. For example, based on the context of the contents displayed at the user interface of the computer application 108, the IME may determine that it is a scenario of chatting based on a pattern of chatting identified from the objects 106 in the chatting window 112.

At 208, the type of input candidates to search for is determined. The IME may determine whether the text candidates 122, the rich candidates 124, both, or none should be searched.

In one embodiment, the types of input candidates may be determined based on the query and data relating to the scenario of the user input. For example, the scenario of the computer application may be determined as a short message service (SMS). As the SMS only supports text, the IME would not request and display the rich candidates 124. The IME may also check whether the computer application supports multimedia messaging service (MMS), and may transform the rich candidates 124 into the form of images when their original forms are videos.

For another example, the IME may further determine what kind of rich candidates 124 are to be searched and presented. In the example of FIG. 1, after analyzing the context of the dialog between the user 102 and the opposing party, the IME may conclude that the query 120 "Sanlitun" refers to a location. Thus the rich candidates 124 may refer to a map showing the location. In another example, after analyzing the context of the dialog between the user 102 and the opposing party in the computer application, the IME may determine that the user 102 and the opposing party are discussing music. When the user 102 enters a query such as "Michael Jackson," the rich candidates 124 may show some famous songs of Michael Jackson such as "Beat it!"

At 210, the input candidates are searched at least partly based on the analyzed scenario of user input, the queries, and the determined type of input candidate.

Different techniques may be used in searching for the text candidates and/or the rich candidates. For example, one input candidate engine may be configured to search both text candidates 122 and rich candidates 124. For another example, the input candidate engine may adjust its language model and lexicon and/or web search service according to the specific scenario at real-time after the identification of the scenario is completed.

For yet another example, there may be a plurality of input candidate engines that form an engine pool. Each input candidate engine is preset for a specific scenario such as chatting, document editing, gaming, and for a specific type of candidates, i.e. text candidates or rich candidates.

At 212, the input candidates are returned and displayed at the user interface 104 of the input method editor. In one example, the user interface 104 of the IME presents the text candidate window 128 and/or the rich candidate window 130 when there are corresponding text candidates 122 and/or rich candidates 124. In another example, the user interface 104 of the IME may present the text candidate window 128 and the rich candidate window 130 even when there are no corresponding text candidates 122 and rich candidates 124.

When the input candidates include rich candidates 124, the IME may use various techniques to present the rich candidates 124 at the user interface 104 of the IME. For example, the rich candidates 124 may be rendered within an embedded web browser component capable of Hypertext Markup Language (HTML) rendering using JavaScript and CSS technologies. Specifically version 5 of HTML (referred to as HTML5) may be supported by this component in order to leverage advanced rendering functionality. The IME may communicate with the browser to display results by generating an HTML string in memory and loading it in the browser. The IME may retrieve the selected rich candidates 124 by catching browser events, such as navigation, and parsing out the rich candidate payload information from the navigation event arguments.

In one or more operating systems, the IME may be implemented in such a way as to not have focus. The focus indicates that a graphical user interface (GUI), such as the user interface 104 of the IME, is currently selected to receive inputs. This may present an issue when interacting with the web browser component and the rich candidates it presents. For example, an "out of process" window may be utilized to render rich candidates. In the Windows® operating systems, an "out of process" window may be invoked as an out of process Component Object Model (COM) server. To present this window properly, interfaces for communication between the user interface 104 of the IME and the COM object may be established to coordinate layout and positioning.

For another example, a particular rich candidate engine may need to have computer-executable instructions or codes registered on the client device 110 to be effective in optimally inserting the rich candidates 124 into the user interface 104 of IME. Some application program interface (API) to communicate with the rich candidate engine may be implemented.

Figure 3:
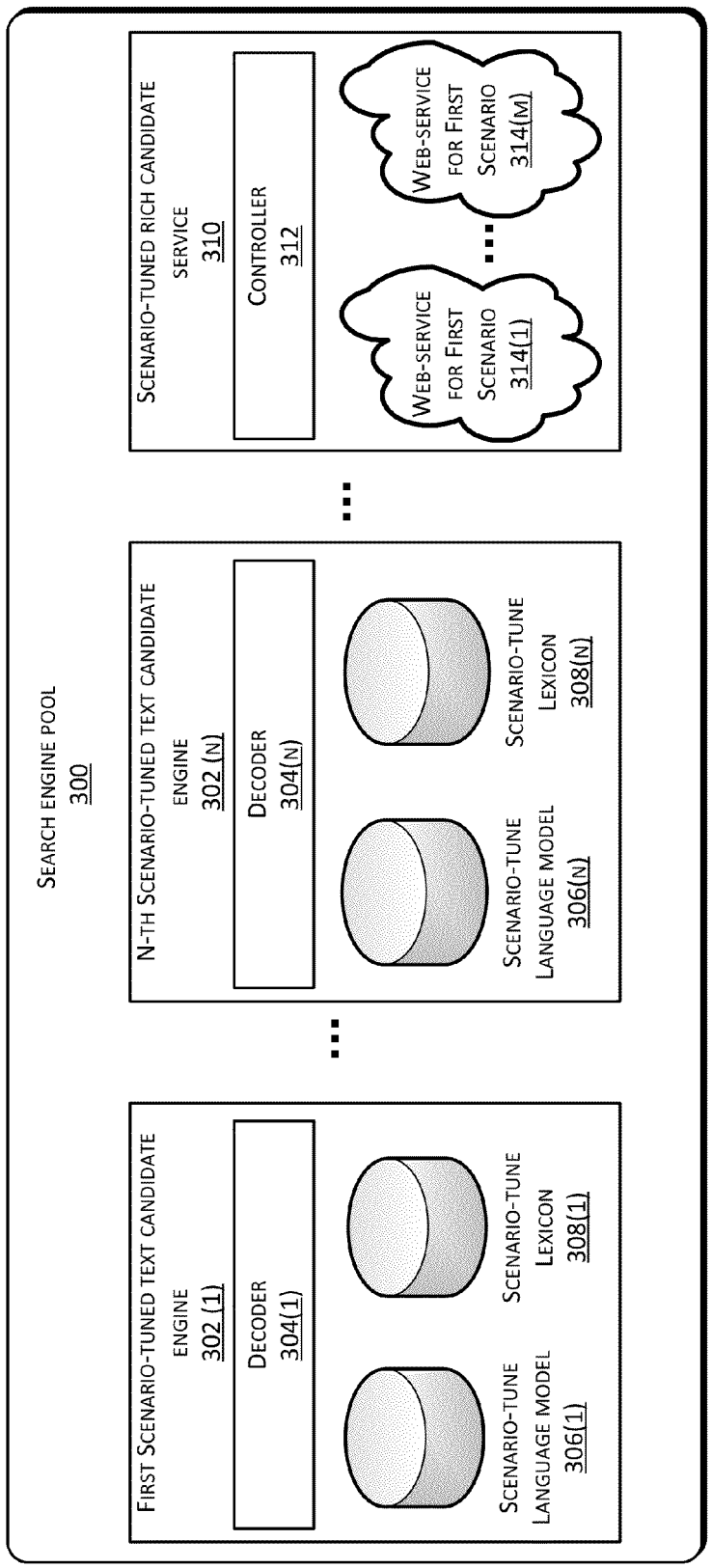
FIG. 3 illustrates a diagram of an example search engine pool.

FIG. 3 illustrates an example search engine pool 300 that includes a plurality of input candidate engines. Each input candidate engine is already pre-configured or tuned for a specific scenario and for a specific type of candidates, i.e. text candidates or rich candidates. For example, the search engine pool 300 includes a first scenario-tuned text candidate engine 302(1), . . . , and a N-th scenario-tuned text candidate engine 302(N). The N can be any integer.

The text candidate engine, such as the N-th scenario-tuned text candidate engine 302(N) may include a decoder 304(N), a scenario-tuned language model 306(N), and a scenario-tuned lexicon 308(N). The decoder 304(N) includes one or more algorithms that process the scenario-tuned language model 306(N) and the scenario-tuned lexicon 308(N). In one example, the decoder 304(N) may be optimized for different text candidate engines, i.e. the decoder 304(1) and the decoder 308(N) may be different. In another example, the decoder 304(N) is the same or substantially the same for some or all text candidate engines, i.e. the decoder 304(1) and the decoder 304(N) may be the same or substantially the same.

The scenario-tuned language model 306(N) and the scenario-tuned lexicon 308(N) are components that are trained on data typically seen in the target scenario, i.e. the N-th scenario. In other words, different scenario-tuned text candidate engines may have different scenario-tuned language models and/or scenario-tuned lexicon.

In one embodiment, the lexicon may be a set of expressions such as words, phrases, and/or sentences. In another embodiment, the lexicon may be a set of expressions, such as words, phrases, and/or sentences, assigned with rankings/probabilities of how they are commonly used. The language model assigns a probability to the sequence of the expressions by means of a probability distribution. If the expressions in the lexicon are already assigned with rankings/probabilities, the language model may adjust the rankings/probabilities according to the scenario. The scenario-tuned language models and scenario-tuned lexicon are pre-configured according to the scenario of the user input. For instance, expressions in the chatting scenario are much more informal than those in the document editing-scenario. A chatting-tuned language lexicon may have more informal expressions compared with a document editing-tuned lexicon, and a chatting-tuned language model ranks the informal expressions higher than those in the document editing-tuned language model.

The engine pool 300 may also include a plurality of rich candidate engines. Each of the rich candidate engines is tuned to a specific scenario, such as chatting, document editing, and gaming. Each of the rich candidate engines may also be a web service tuned for a specific scenario.

In the example of FIG. 3, the scenario-tuned rich candidate engine 310 may, for example, utilize one or more web services, such as search engines, to return the rich candidates. The controller 312 may select a web service depending on the scenario. In an example implementation, there may be a first web service for a first scenario 314(1), . . . , and a M-th web service for a M-th scenario. M can be any integer and may or may not be the same as N.

Some web services may rely on account information of the user 102 that the user 102 registers with such web services. For example, the engine pool 300 may allow remote calls to be made securely and potentially on behalf of the user 102 to use authentication techniques to connect with user services like micro blogging accounts.

Alternatively, some web services may not rely on whether the user has registered services. For example, such services may include web search related services, such as image search, mapping services, and video search.

The search engine pool 300 may add, delete, or modify a text candidate engine or rich candidate engine corresponding to a new or an existing scenario. The isolation of different engines also helps to improve the flexibility and robustness of the search engine pool 300 in which failure or removal of one input candidate engine would not affect another.

In one embodiment, the engine pool 300 may also include a default text candidate engine, such as the N-th scenario text candidate engine 302(N) and a default rich candidate engine, such as web service for M-th scenario 314(M) to provide input candidates when the scenario of the computer application cannot be determined or there is no input candidate engine in the engine pool 300 tuned for the scenario of the computer application.

When an appropriate scenario-specific engine cannot be found, the default engine for a particular request type, such as the N-th scenario text candidate engine 302(N) and web service for M-th scenario 314(M) may be selected to identify the input candidates.

In one example, the default text candidate engine or the default rich candidate engine is not pre-configured to a specific scenario. For instance, the default rich candidate engine is tuned to a general scenario such as using the search engine such as Bing® service to return rich candidates based on the query without limiting the scenario of the user input.

In another example, the default text candidate engine or the default rich candidate engine may be a designated text candidate engine tuned for a specific scenario, such as document-editing, and a designated rich candidate engine tuned for a specific scenario, such as chatting. If the scenario of the computer application cannot be determined, then such default designated text candidate engine or rich candidate engine is selected.

In another embodiment, when the types of input candidates to be searched cannot be determined, the IME may only choose the default text candidate engine to identify the text candidates without using any rich candidate engine. This may avoid generating unnecessary rich candidates that distract the attention of the user 102 and lengthening the time to identify input candidates.

In yet another embodiment, when an appropriate scenario-specific engine cannot be found, the IME may return an error message to display on the user interface 104 of the IME to indicate to the user 102 that no input candidates can be offered.

Figure 4:
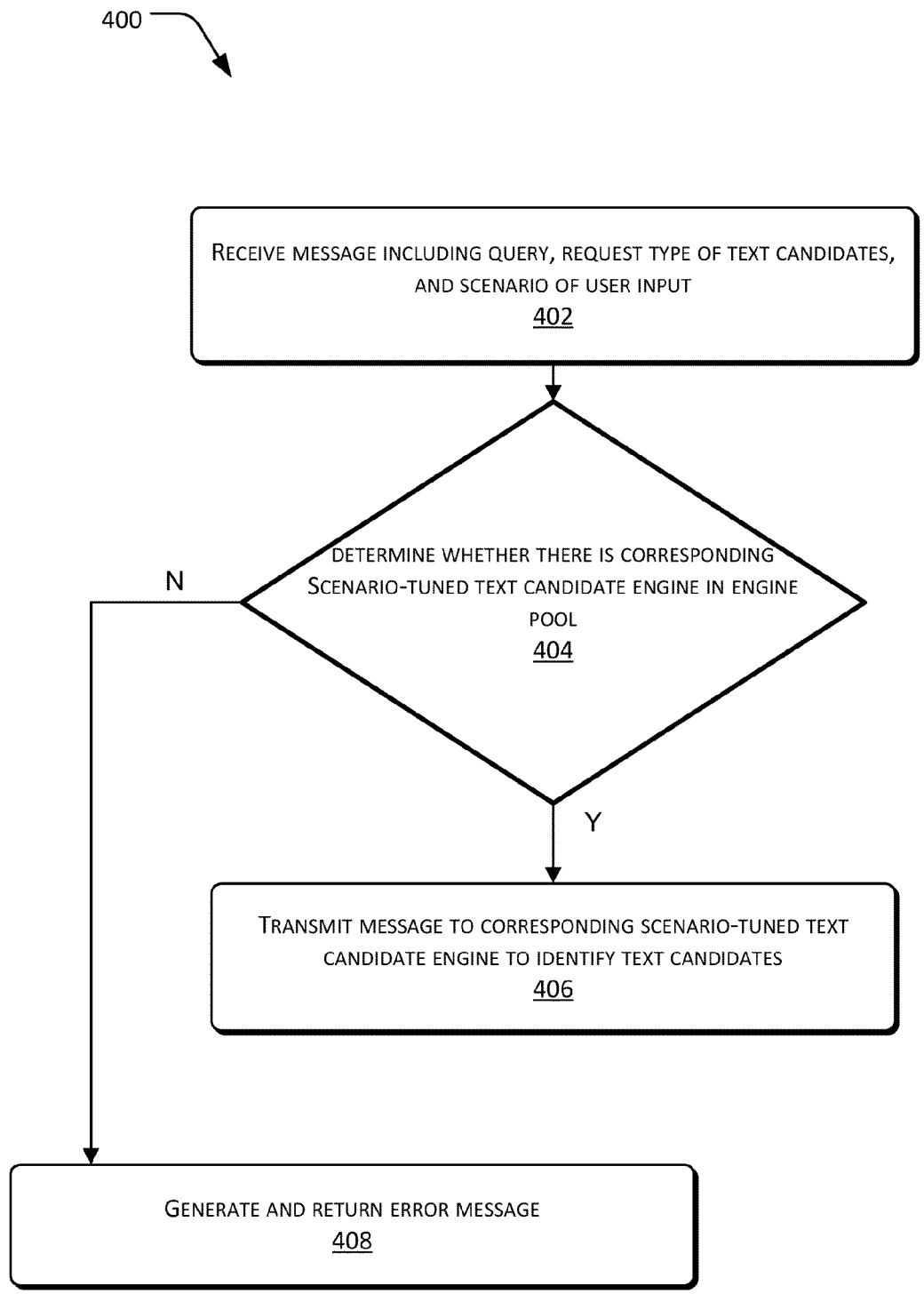
FIG. 4 illustrates a flowchart for an example method for identifying text candidates.

FIG. 4 illustrates a flowchart for an example method 400 for identifying text candidates.

Referring back to 208, it is determined that the type of input candidates to be searched is text candidates.

At 402, a message including the user-submitted query, the request type of text candidates, and the scenario of user input is received by the IME. For example, the scenario of user input and other information may be in the form of a text string.

At 404, a selection component of the IME determines whether there is a scenario-tuned text candidate engine in the engine pool that corresponds to the scenario indicated in the request.

At 406, in an event that the result of the determination is positive, the message is transmitted to the scenario-tuned text candidate engine to identify the text candidates.

At 408, in an event that the result of the determination is negative, an error message is generated and may be presented at the user interface 104 of the IME. Alternatively, the message may be transmitted to a default scenario-tuned text candidate engine to identify the text candidates.

Figure 5:
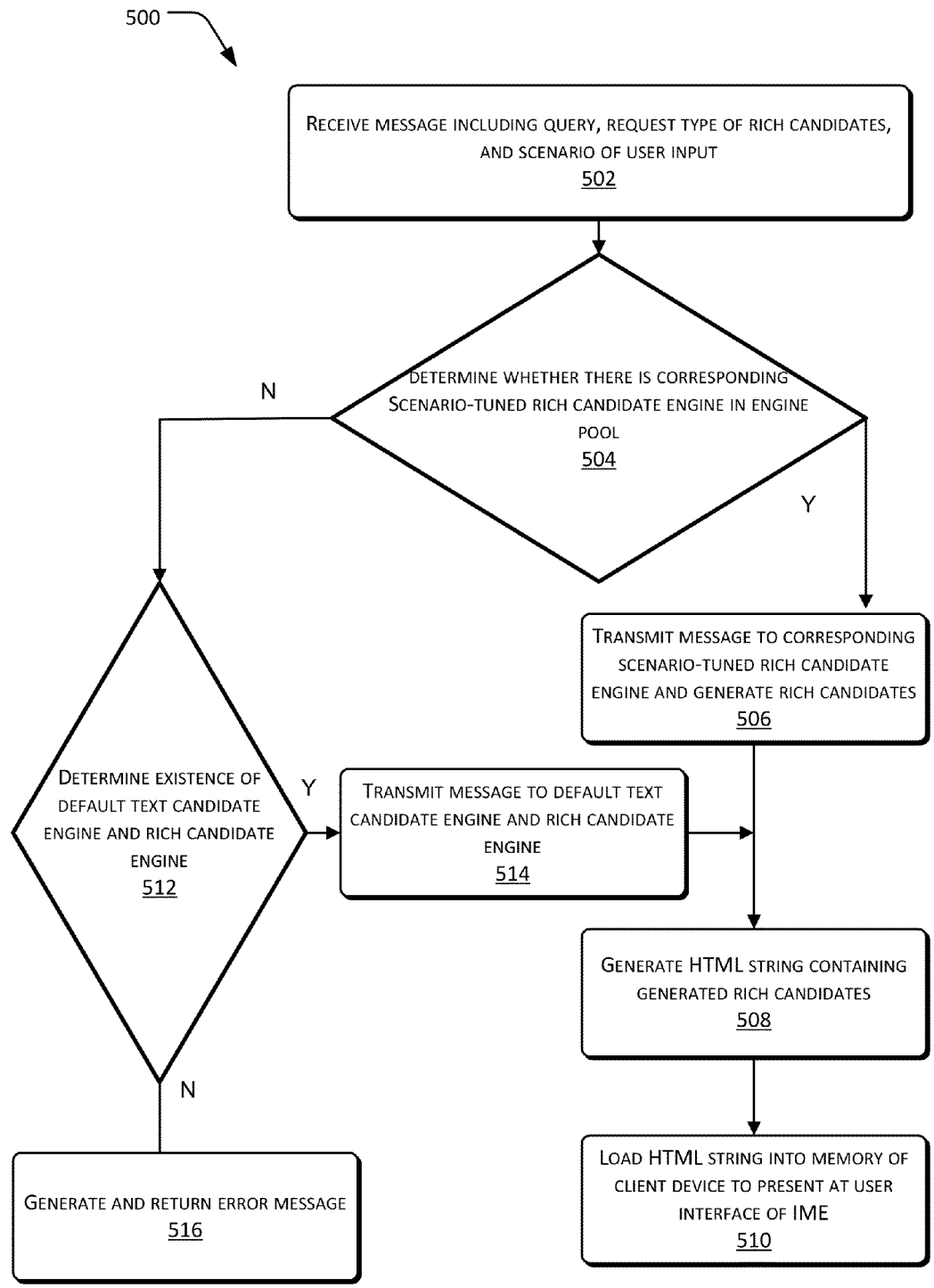
FIG. 5 illustrates a flowchart for an example method for identifying or generating rich candidates.

FIG. 5 illustrates a flowchart for an example method 500 for generating rich candidates. Referring back to 208, it is determined that the type of input candidates to be searched is rich candidates 124. At 502, a message including the user submitted query, the request type of text candidates, and the determined scenario of user input is received by the IME. For example, the scenario of user input and other information may be in the form of a text string.

At 504, a selection component of the IME determines whether there is a scenario-tuned rich candidate engine in the engine pool that corresponds to the scenario.

At 506, in an event that the result of the determination is positive, the message is transmitted to the scenario-tuned rich candidate engine such as a web service to identify the rich candidates. For example, the scenario-tuned rich candidate engine may be preset with a plurality of parameters tuned to the scenario. In a chatting scenario, for example, the query is "haha," which represents the sound of a laugh. The chatting-tuned rich candidate engine may, for example, search images and multimedia by using the query "haha" and limiting the type to cartoon images and multimedia.

At 508, an HTML string containing the rich candidates is identified or generated. The HTML string may, for example, srefer to JavaScript or cascading style sheets (CSS) resources files locally stored at the client device 110. The string may also refer to external resources like photos or video files available over a network such as the internet or intranet.

At 510, the HTML string is loaded into memory of the client device 110 to present at the user interface 104 of the IME. For example, an embedded web browser may be used for the rich candidate window.

At 512, in an event that the result of the determination at 504 is negative, the selection component of the IME also determines whether there exists a default text candidate engine and/or a default rich candidate engine. At 514, in an event that the result of the determination at 512 is positive, the selection component of the IME transmits the message to the default text candidate engine and/or the default rich candidate engine. The operations continue to 508.

At 516, in an event that the result of the determination at 512 is negative, an error message is generated and may be presented at the user interface 104 of the IME.

Example Application Scenarios

The techniques below are described in the context of different scenarios. However, the techniques described herein are not limited to implementation of the specific described scenarios. Unless specified otherwise, one of ordinary skill in the art can apply or extend the techniques described in one scenario to another.

FIG. 6A and FIG. 6B illustrate how text candidates may be determined differently for different scenarios when query 602 are same.

In both FIG. 6A and FIG. 6B, the query 602 are the same "fz," which is an abbreviated spelling corresponding to numerous Chinese words.

In FIG. 6A, the computer application 604 is determined as a document editing application. For example, the name of the computer application 604 is identified to be Microsoft Word®, and, accordingly, a "document editing" scenario may be determined according to the name. In FIG. 6A, the user interface 606 of the IME is placed on top of the user interface of the computer application 604.

In view of the scenario of document editing, a text candidate engine tuned to the document editing scenario is selected. The text candidates 608 are identified at least partly based on the scenario and the query 602.

In the example of FIG. 6A, the text candidates 608 include three Chinese terms. As the scenario of document editing requires more formal language style, these Chinese terms are more formal than those in FIG. 6B which is described below.

The first Chinese term, 复杂, means "complicated" in English. The second Chinese term, 反正, means "nonetheless" in English. The third Chinese term, 房子, means "house" in English. The user 102 may select more Chinese terms by clicking the button 610.

Based on the scenario of the user input including the context of the user input, i.e. input objects 612 already presented at the user interface of the computer application 604, the Chinese terms are ranked according to their relevancies to the scenario. The Chinese term, 复杂, which means "complicated" in English, ranks first in FIG. 6A.

In FIG. 6B, the computer application 614 is determined as a chatting application. For example, the name of the computer application 614 is identified to be Microsoft MSN®, and, accordingly, a "chatting" scenario may be determined according to the name. In FIG. 6B, the user interface 616 of the IME is placed on top of the user interface of the computer application 614.

In view of the scenario of chatting at least partly based on the name of the computer application 614, a chat-tuned text candidate engine that is tuned to the chatting scenario is selected. The text candidates 618 are identified at least partly based on the chatting scenario and the query 602.

In the example of FIG. 6B, the text candidates 618 include three Chinese terms. As the scenario of chatting typically employs less formal language style and more oral language style, these Chinese terms are less formal.

The first Chinese term, 发指, means "horrible" in English. The second Chinese term, 封装, means "capsulation" in English. The third Chinese term, 疯子 means "crazy guy" in English. The user 102 may select more Chinese terms by clicking the button 620.

Based on the determined scenario of the user input including the context of the user input, i.e. the input objects 622 already presented at the user interface of the computer application 614, the Chinese terms are ranked according to their relativities to the scenario. The Chinese term, 发指, which means "horrible" in English ranks first in FIG. 6B.

Thus, as illustrated in FIGS. 6A and 6B, using scenario-tuned text candidate engines can result in contextually applicable text candidates based on a determined scenario from which a user-submitted query is received.

Figure 7:
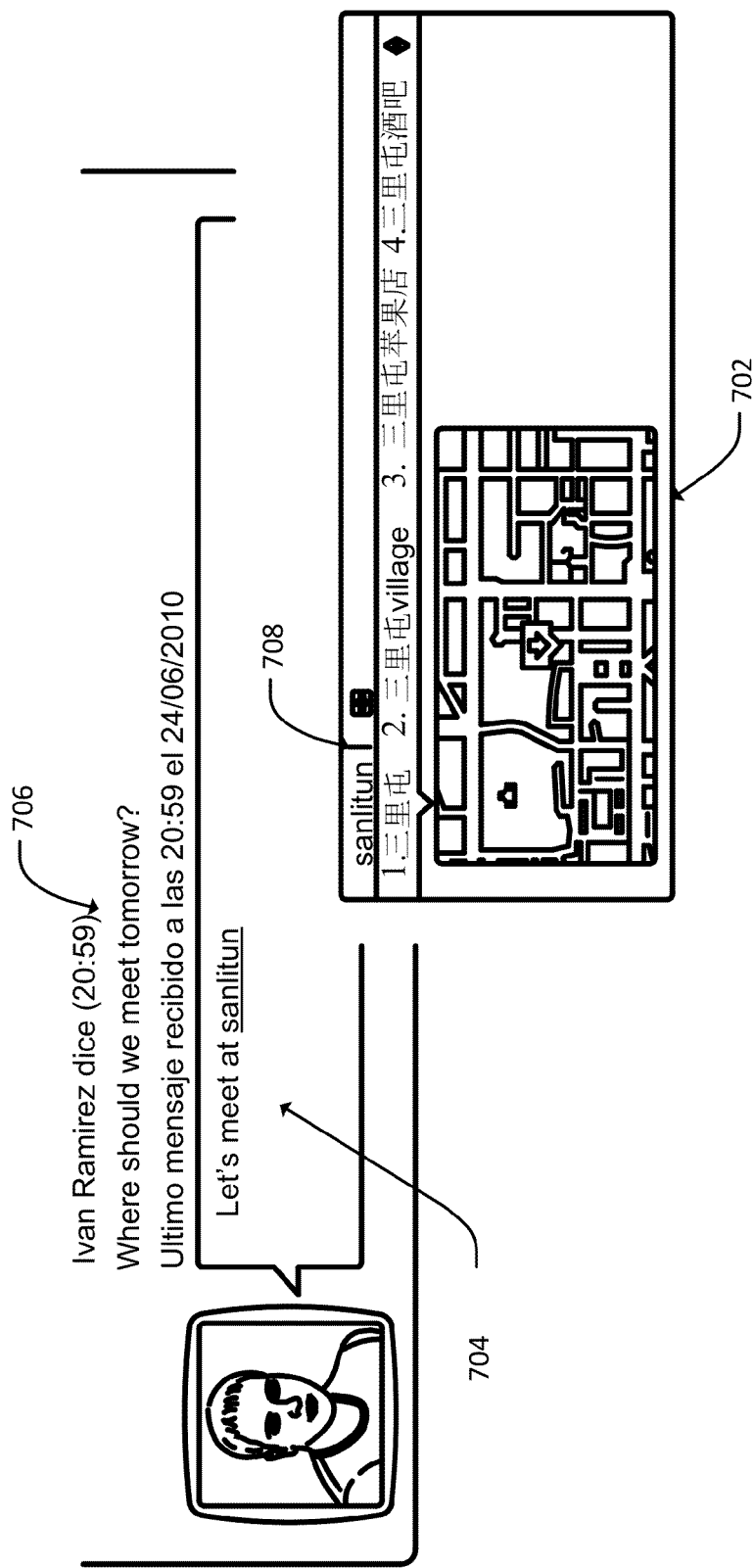
FIG. 7 illustrates providing rich candidates based on varying degrees of information in the scenario of the user input.

FIG. 7 illustrates providing rich candidates based on varying degrees of information in the scenario of the user input.

To generate or identify the rich candidates 702 like the map in FIG. 7, context of the scenario of the user input may be used with varying degrees of specificity. For example, in the example of FIG. 7, the input object 704 shows that the user 102 only inputs "Let's meet at Sanlitun." Accordingly, the map may only show the regional map information around the location Sanlitun.

However, the rich candidates 702 may further include another map (not shown in FIG. 7) that shows a direction from the address of the user 102 or the address of the opposing party to the location Sanlitun. For example, the objects already displayed on the chatting window or the input objects at the input window may include information such as "I'm at location X" and "Meet me at location Sanlitun." Such context could be used for producing a directional map. For example, a map candidate would not just be of point Y such as the location of Sanlitun, but be a map where one or more paths from X to Sanlitun are shown.

The rich candidate engine (not shown in FIG. 7) may use web mapping services, such as those found on web search engines like Microsoft Bing® to generate or identify the rich candidates 702. The scenario of the user input such as the address information and the query 708 "Sanlitun" are relevant parameters to be used by such a web service.

Figure 8:
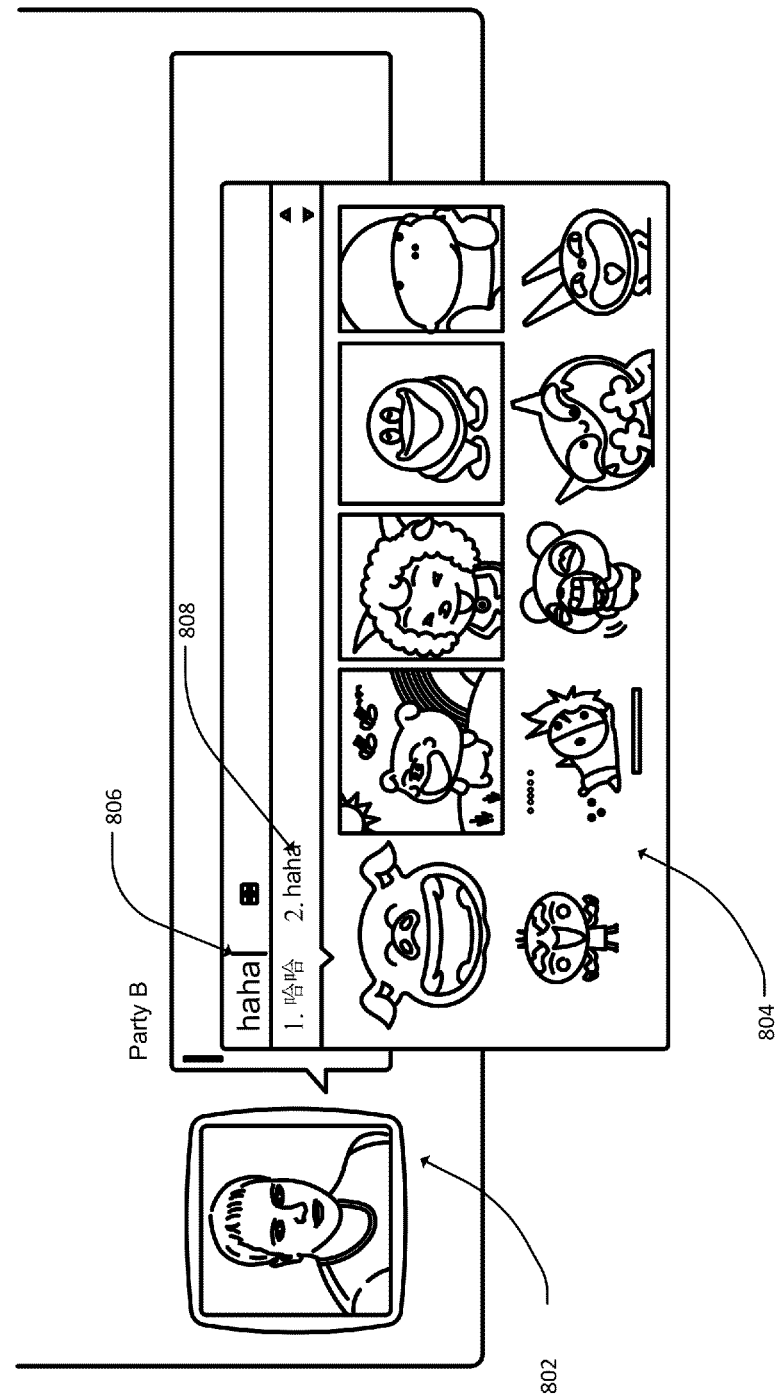
FIG. 8 illustrates providing rich candidates in a form of images.

FIG. 8 illustrates providing rich candidates in a form of images.

In the example of FIG. 8, the computer application 802 is a chatting application. To trigger a rich candidate engine to generate or identify the rich candidate such as image candidates, the scenario of the user input is important. For example, for the query 806 "haha," the chat-tuned text candidate engine identifies text candidates 808 including two terms, i.e. "哈哈" in Chinese, which means "smile" in English, and "haha" in English which also means the sound of a laugh.

The selection component of the IME may choose the chat-tuned rich candidate engine to identify the rich candidates 804 based on the fact that the scenario is chatting. Image candidates are appropriate in an informal chatting scenario; however in another scenario like formal document editing, it may be preset as inappropriate in some embodiments. Therefore, for a different scenario, the type of input candidate may not include rich candidates, and thus the rich candidates would not be searched and presented.

Figure 9:
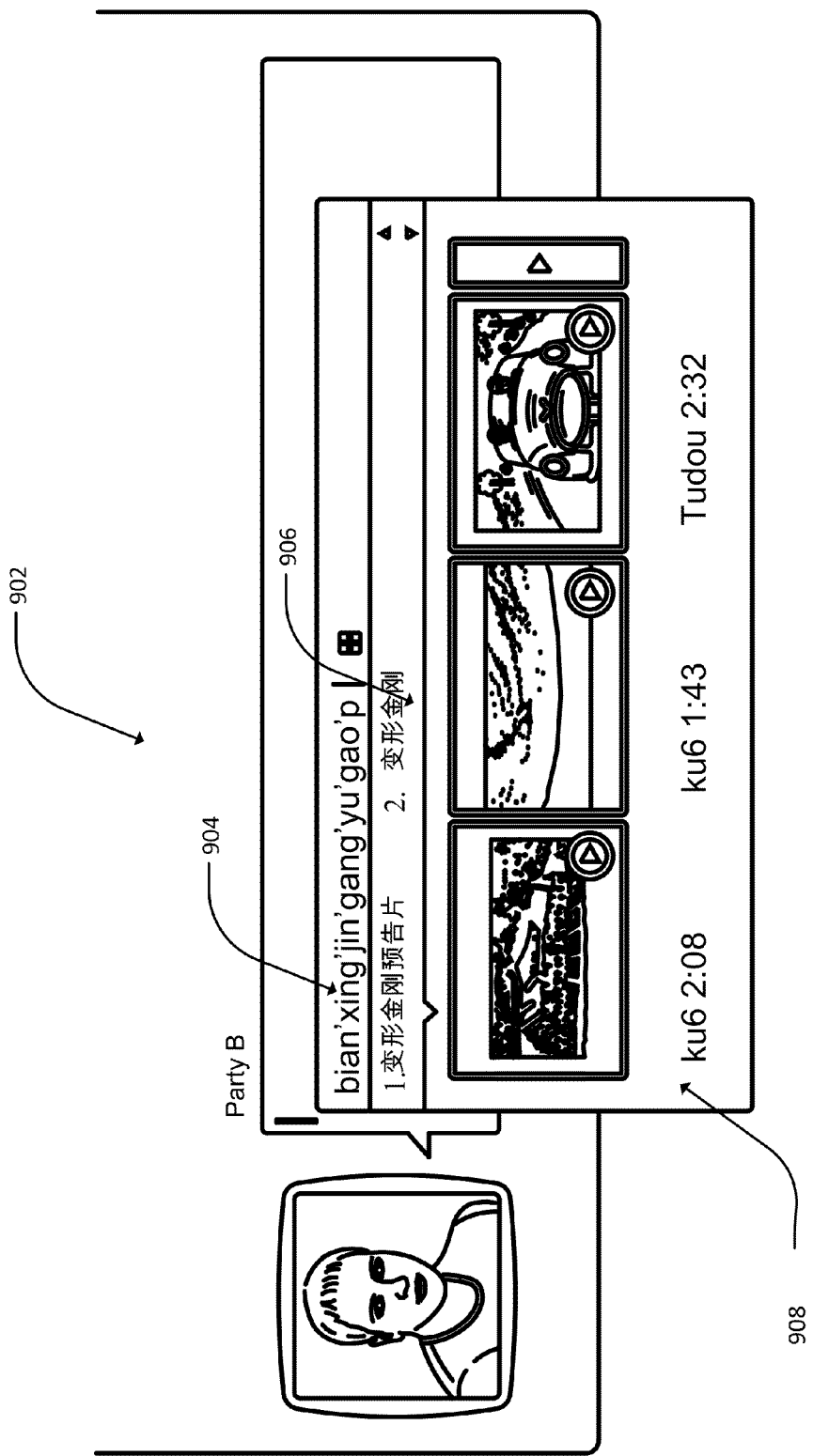
FIG. 9 illustrates rich candidates in a form of videos.

FIG. 9 illustrates providing rich candidates in a form of videos.

To trigger a rich candidate engine to generate or identify rich candidates such as video candidates, the scenario of the user input is important. For example, if the queries match a movie name and the scenario is chatting, the IME may determine a video rich candidate is proper. However when the user is authoring a formal document, such as a high school research report on a film maker's work, an embedded video would not be warranted and the video rich candidate may not be presented.

In the example of FIG. 9, the computer application 902 is a chatting application. The queries 904 are "bian'xing'jin'gang'yu'gao'p," which are a spelling of the Chinese phrase "变型金刚预告片," which means "preview of Transformer" in English. The text candidates 906 include two Chinese terms "变 型金刚预告片" and "变型金刚" which are ranked according to their relativity to the queries. The Chinese term "变型金刚预告片" is ranked first while the Chinese term "变型金刚" is ranked second.

The chat-tuned rich candidate engine may use web video search services, such as those found on web search engines like Microsoft Bing®, to search for videos relating to the "变型金刚预告片" to enhance the richness of the user's input to aid in productivity. The rich candidates 908 include three videos from different websites such as "Ku6" and "tudou," and each have different parameters such as different video lengths.

Depending on the capability of the chat application 902, the integration could include embedding the rich candidates 906 in the form of video in varying degrees of fidelity into the chat stream. For example, if the chat application 902 does not allow for video itself to be directly embedded, but an animated gif is supported, the IME could use a web service to convert the video to an animated image such as an animated GIF format to provide an optimal integration. Another fallback is a still image of the video, such as the one found in the thumbnail representation on video search engines. The final fall back would be a hyperlink alone, pointing to the video online.

Figure 10:
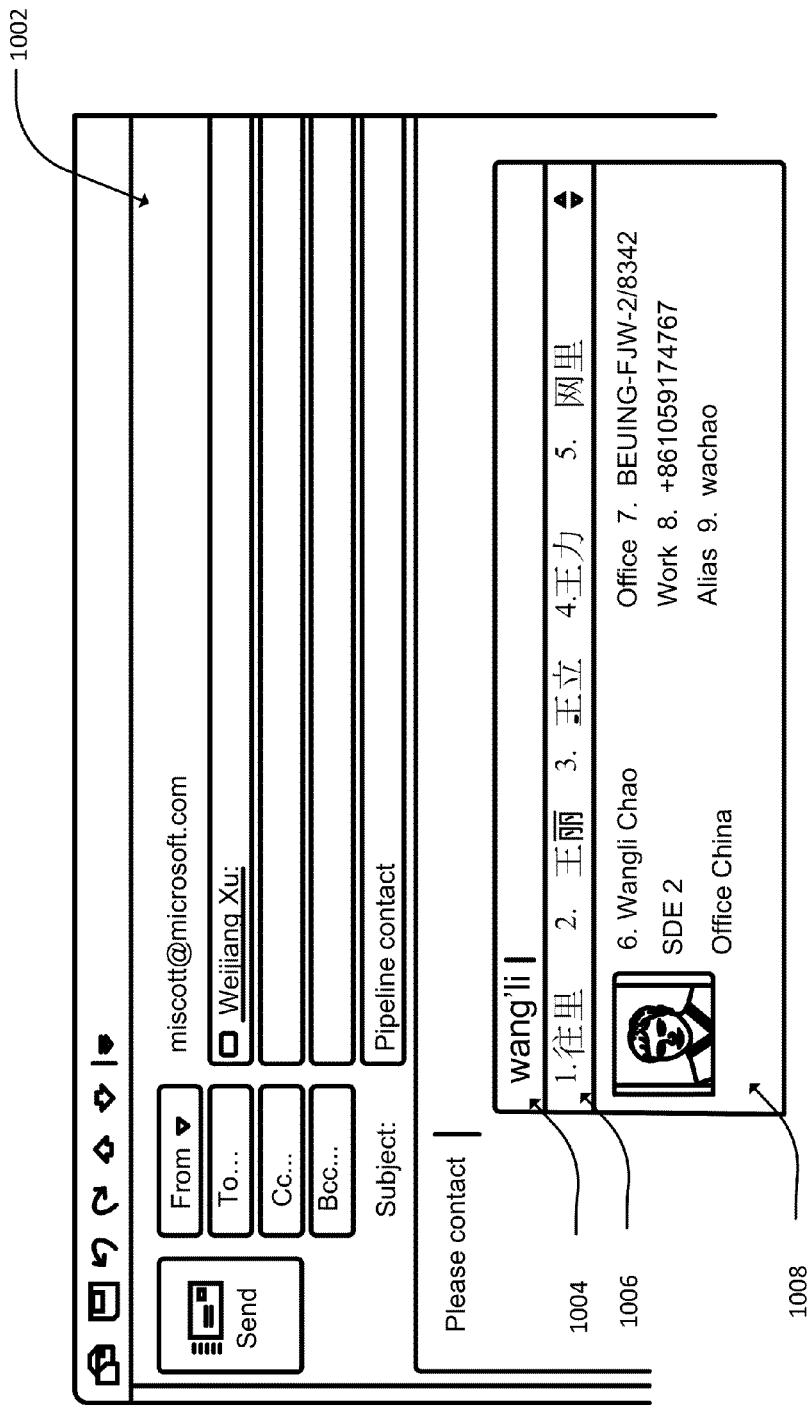
FIG. 10 illustrates rich candidates in a form of address book entries.

FIG. 10 illustrates providing rich candidates in a form of address book entries.

In the example of FIG. 10, the computer application 1002 is an email application such as Microsoft Outlook®. When the user 102 inputs the query 1004 "Wangli," the returned text candidates 1006 include five Chinese terms corresponding to the spelling of "Wangli."

The rich candidates 1008 include detailed contact information of a person named "Wangli Chao." The rich candidate engine tuned to the mail scenario may use an address book service, which may be available, for example, through a local mail service application such as Microsoft Outlook® or a remote address book service, such as Microsoft Exchange® server.

Figure 11:
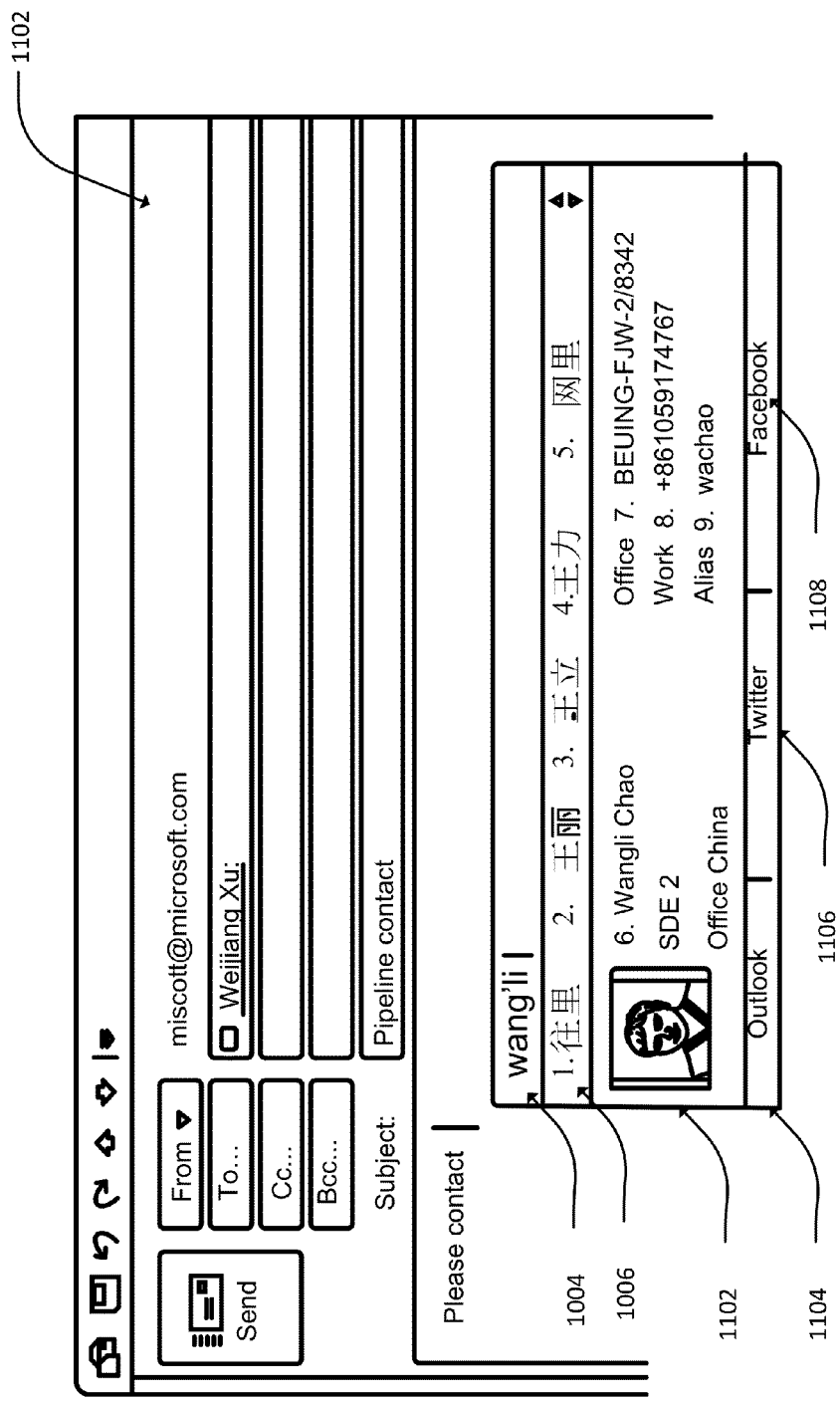
FIG. 11 illustrates rich candidates in a form of address book entries from multiple sources.

FIG. 11 illustrates providing rich candidates in a form of address book entries from multiple sources. This assists the user 102 to quickly input contact information of a person from multiple address book entries by using the name of the person as the query.

The computing application 1102 is an email application. If the user 102 has subscribed to multiple address book services, the address book services will be ranked according to their relevancies to the current scenario. In the example of FIG. 11, the available services are listed at the bottom of the rich candidate window 1102. The item 1104 represents an address book service from Microsoft Outlook®. The item 1106 represents an address book service from a micro-blog service, such as Twitter®. The item 1108 represents an address book service from a social network service, such as Facebook®.

The item 1104 is ranked first as it is more appropriate to the current scenario compared to the items 1106 and 1108. For example, it is determined that the queries 1104 match the name of an address book entry in Microsoft Outlook® and the computer application 1102 is Microsoft Outlook® and the source of Microsoft Outlook® ranks first based on the scenario of the computer application 1102.

The rich candidate view presents address book entries from multiple sources in one user interface of the IME and is easier for the user 102 to switch between different sources to select a desired address book entry.

Figure 12:
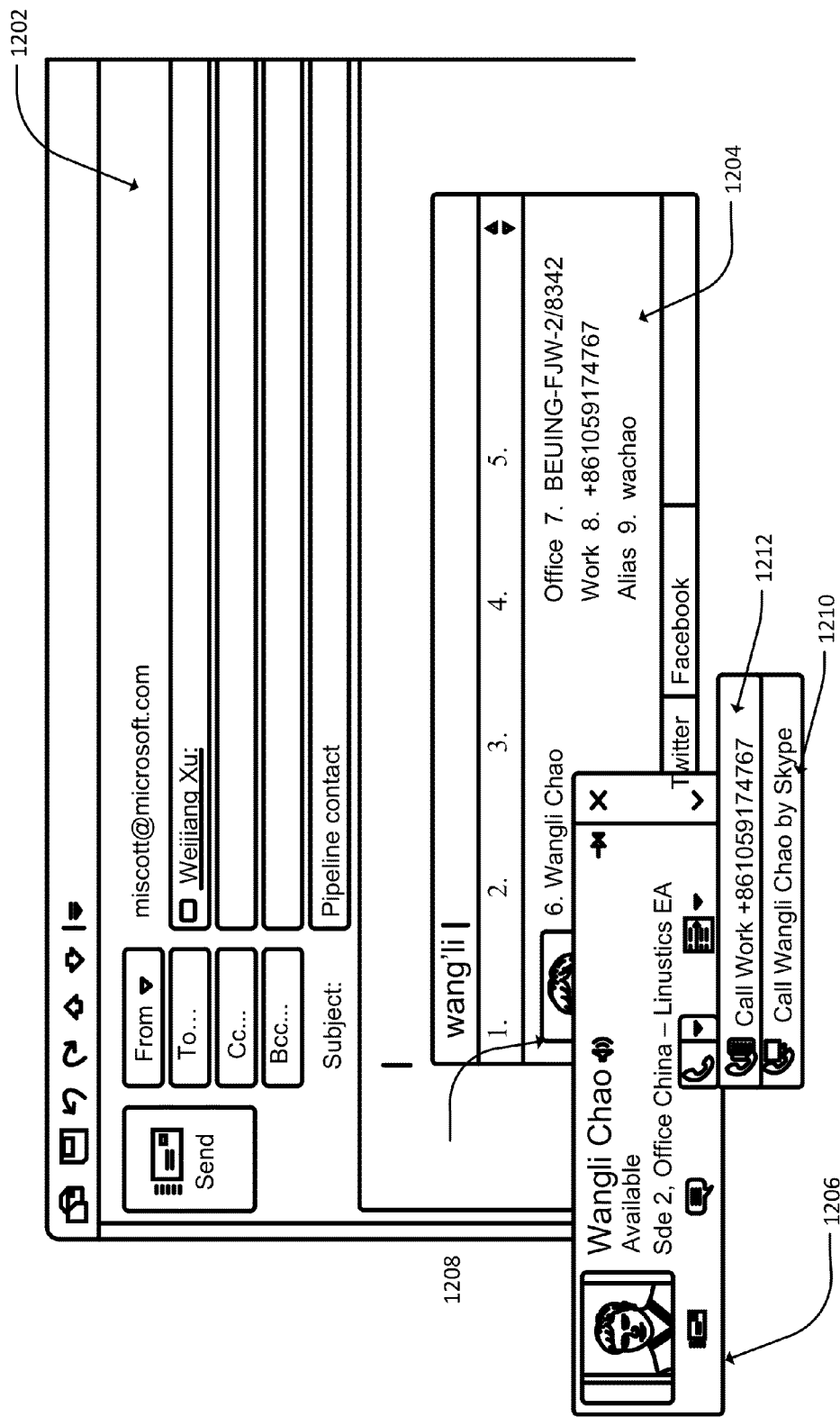
FIG. 12 illustrates rich candidates linked with applications.

FIG. 12 illustrates rich candidates linked with applications.

In the example of FIG. 12, the computer application 1202 is an email application and the rich candidates 1204 include an address book entry. A separate application 1206, distinct from the IME and the computer application 1202 that receives input objects, such as Microsoft Lync® can be launched, for example, by clicking over the contact's photo 1208 included in the rich candidates 1204. This would further enable other applications, such as calling by Skype® and calling a phone number if the user clicks corresponding items 1206 and 1208 respectively.

The user 102 thus needs not to open the application 1206 in another session to conduct operations. Such operations to launch the application 1206 can all be done through and within the user interface of the IME.

Figure 13:
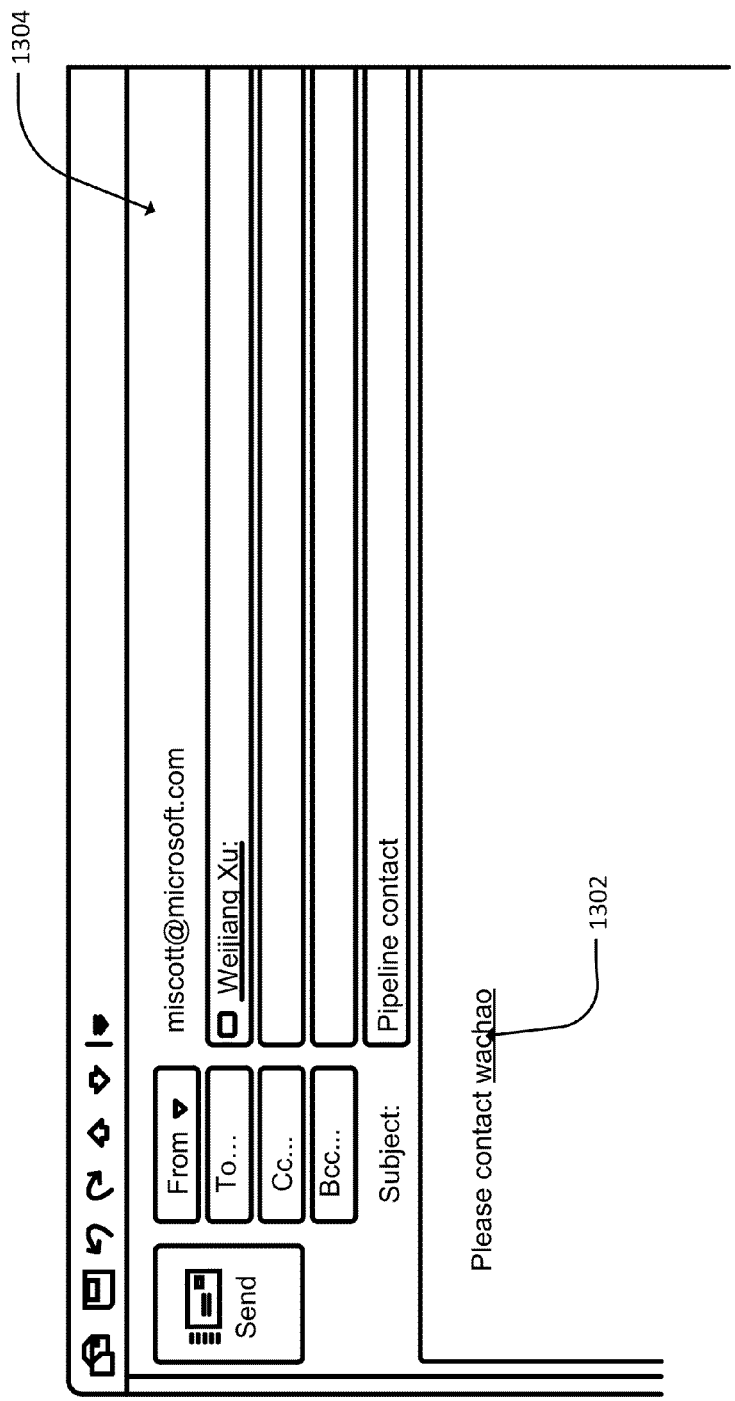
FIG. 13 illustrates presentation of rich candidates in an optimized form in view of the scenario.

FIG. 13 illustrates scenario-adapted integration of rich candidates.

A user-selected rich candidate 1302 is inserted in an optimal format under the scenario of the computer application 1304. The computer application 1304 is an email application. In the case of inserting an email address, if the computer application 1304 supports email hyperlinks, the rich candidate 1302 would be specially formatted as an email hyperlink according to the format supported by the computer application 1304.

Figure 14:
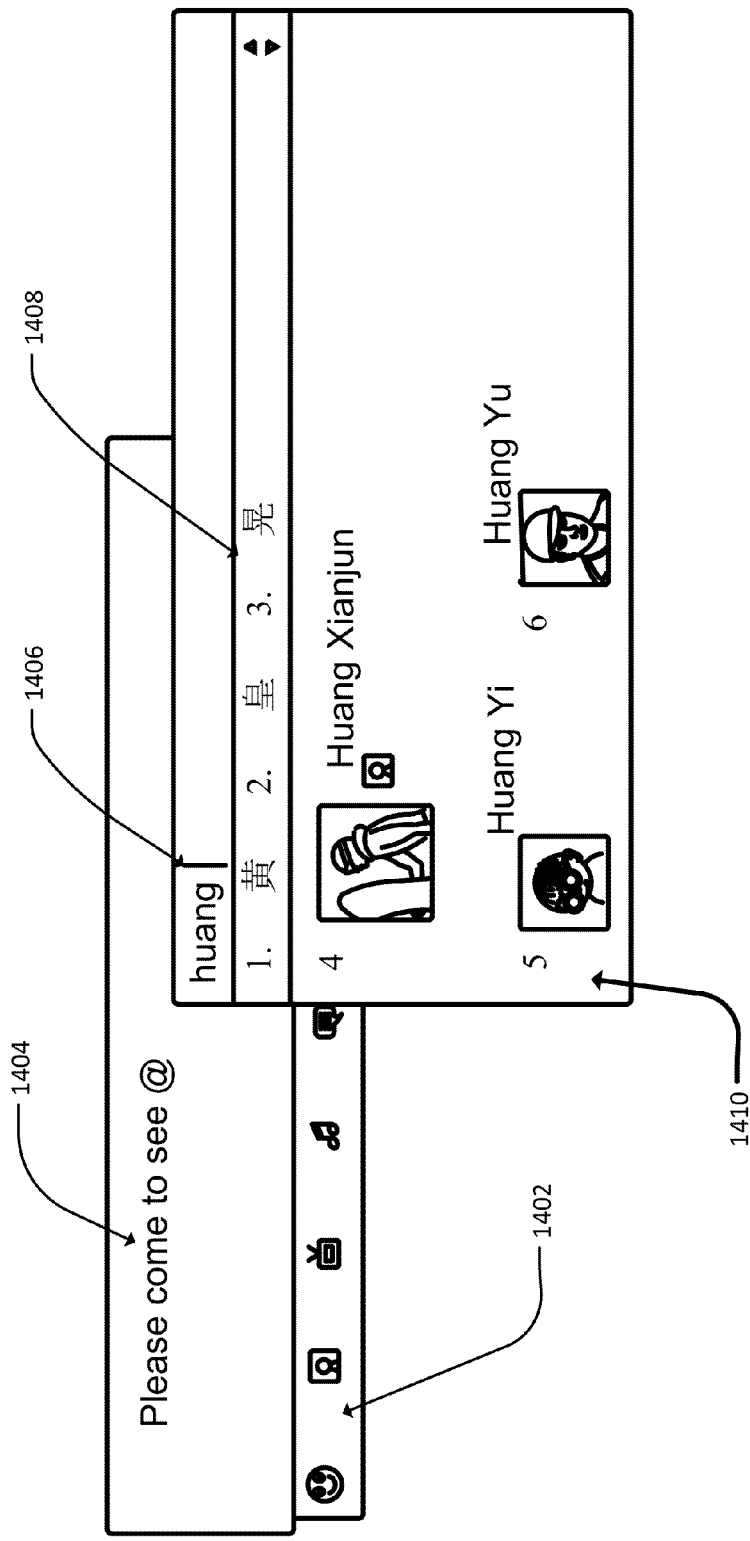
FIG. 14 illustrates rich candidates in an example social network scenario.

FIG. 14 illustrates rich candidates in an example social network scenario.

The social networking applications such as Facebook® or social micro-blogging services like Twitter® or Sina Weibo® are currently very popular. The IME may receive and store the authentication credentials, such as user names and passwords, for the services the user 102 likes to use, such as the social network applications, through the input of the user 102. The IME would then be able to provide social networking relevant rich candidate results in specific scenarios.

In the example of FIG. 14, the computer application 1402 is a micro blogging website such as Sina Weibo®. In the scenario of entering a user name for a microblog post, the user first enters input object 1404 "please come to see @." The symbol "@" refers to a user name or nickname in the context of the computer application 1402. The IME may first use the stored authentication credential to access account and contact information of the user 102 stored at the computer application 1402 either at a local client device or at a remote server.

The IME then suggests user names based on a search of a query 1406 from the accessed contract information of the user 102 at the computer application 1402.

Text candidates 1408 shows three Chinese terms corresponding to the English spelling "Huang" as the query 1406. Rich candidates 1410 show three user names, which are "Huang Xianjun," "Huang Yi," and "Huang Yu."

The rich candidates 1410 are retrieved from the accessed account information and contract information of the user 102 stored at the computer application 1402. The rich candidates 1410 represent full names of users by using the query 1406 and may include useful reference information such as the "status" information of the corresponding users and picture.

An Exemplary Computing System

There may be various configurations of the IME. In one embodiment, as shown in FIG. 15A, all components of the IME 1502 are located at the client device 110.

Figure 15A:
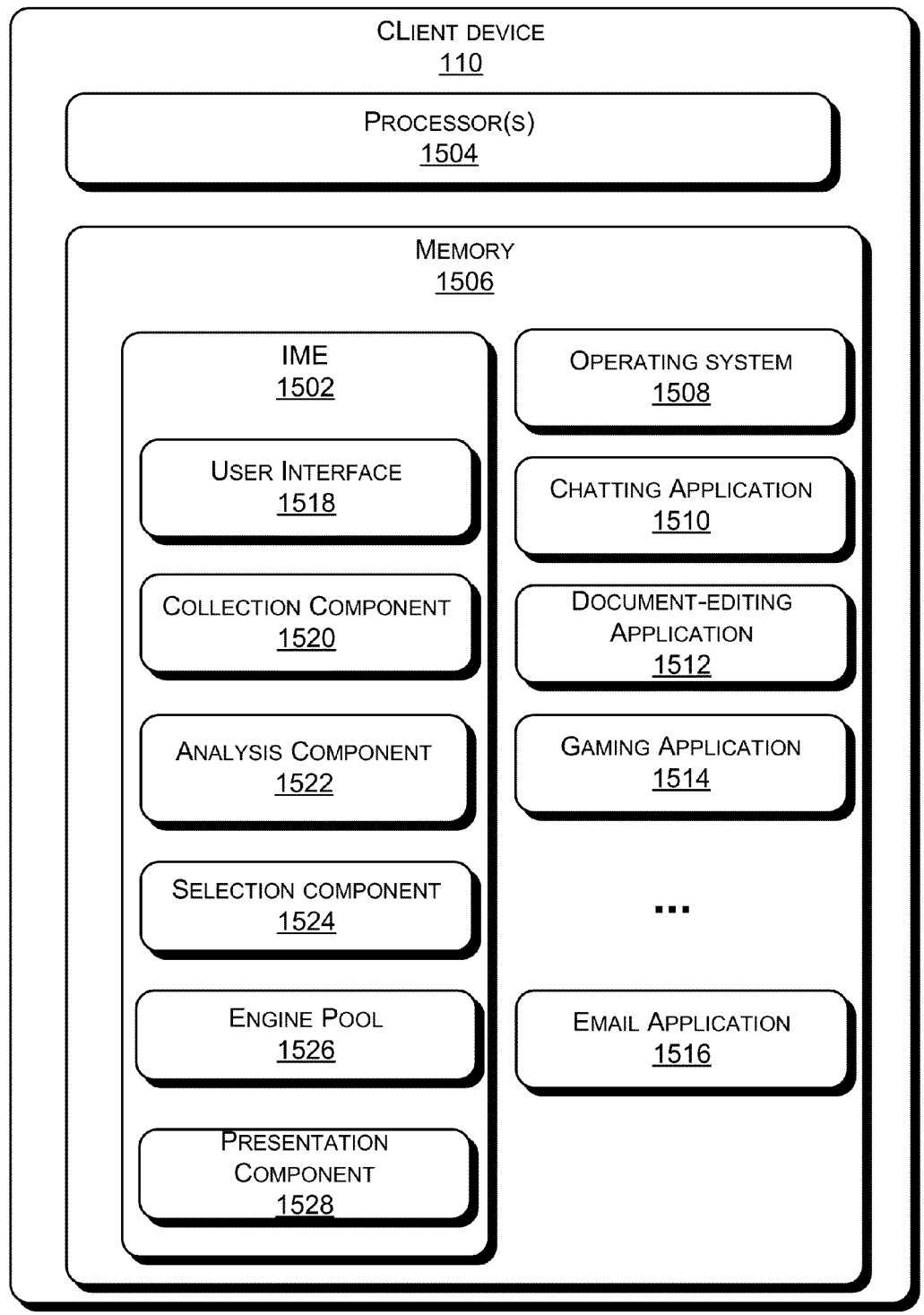

FIG. 15A illustrates an exemplary embodiment of the IME 1502, which can be used to implement the techniques described herein, and which may be representative, in whole or in part, of elements described herein.

The client device 110 may, but need not, be used to implement the techniques described herein. The client device 110 is only one example and is not intended to suggest any limitation as to the scope of use or functionality of the computer and network architectures.

The components of the client device 110 include one or more processors 1504, and memory 1506. Memory 1506 may include volatile memory, non-volatile memory, removable memory, non-removable memory, and/or a combination of any of the foregoing. Generally, memory 1506 contains computer executable instructions that are accessible and executable by the one or more processors 1504.

The memory 1506 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Any number of program modules, applications, or components can be stored in the memory 1506, including by way of example, an operating system 1508, one or more computer applications such as the input method editor 1502, a chatting application 1510, a document-editing application 1512, a gaming application 1514, and an email application 1516, other program modules, program data, computer executable instructions.

The input method editor 1502 includes a user interface 1518, a collection component 1520, an analysis component 1522, a selection component 1524, an engine pool 1526, and a presentation component 1528.

The user interface 1518 receives queries from the user 102 and presents the returned text candidates and/or rich candidates. The collection component 1520 collects data relating to the scenario of the user input and the queries. The analysis component 1522 analyzes the collected data and determines a type of input candidates to request and the scenario of the user input. The selection component 1524 selects a scenario-tuned and type-specific input candidate engine from the engine pool 1526 based on the queries, the scenario of the user input, and the determined type of input candidates.

The engine pool 1526 includes a plurality of input candidate engines, each of which may be designed for a specific type and scenario. The engine pool 1526 may also include a default text candidate engine and/or a default rich candidate engine to generate and/or identify input candidates when the scenario cannot be determined or there is no input candidate engine tuned to the specific type and scenario.

The presentation component 1528 displays the returned input candidates including the text candidates and/or rich candidates at the user interface 1518.

Some modules of the IME 1502 may be implemented as separate systems and their processing results can be used by the IME 1502.

For the sake of convenient description, the above IME is functionally divided into various modules which are separately described. When implementing the disclosed system, the functions of various modules may be implemented in one or more instances of software and/or hardware.

The IME 1502 may be used in an environment or in a configuration of universal or specialized computer systems. Examples include a personal computer, a server computer, a handheld device or a portable device, a tablet device, a multiprocessor system, a microprocessor-based system, a set-up box, a programmable customer electronic device, a network PC, and a distributed computing environment including any system or device above.

In the distributed computing environment, a task is executed by remote processing devices which are connected through a communication network. In the distributed computing environment, the modules may be located in storage media (which include data storage devices) of local and remote computers.

In another embodiment, as shown in FIG. 15B, the components of the IME 1502 are located at both the client device 110 and a server 1530 to provide functionality.

In the example of FIG. 15B, the IME 1502 resides at both the client device 110 and the server 1530, separate from the client device 110. The client device 110 and the server 1530 may communicate through a network 1532. The network 1532 may be the internet or an intranet, and may include wired and wireless networks. For brevity, FIG. 15B does not show the operating system 1508 and the various computer applications as shown in FIG. 15A. It is appreciated that the various computer applications such as the chatting application 1510, document-editing application 1512, the gaming application 1514 and the email application 1516 may also use a client-server architecture or a web service.

In the example of FIG. 15B, the user interface 1518, the collection component 1520, the analysis component 1522, and the presentation component 1528 reside at the client device 110. The selection component 1524 and the engine pool 1526 are located at the server 1530.

There may be other configurations of an IME in the client-server architecture. In another example the selection component 1524 may be located at the client device 110. In yet another example, the components that are located at the client device 110 and the server 1530 may be different from those in FIG. 15B. For example, the engine pool 1526 may reside at another independent server (not shown) separate from the server 1530 that hosts the selection component 1524.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
   determining that a user is using an input method editor (IME) to input one or more input candidates into a first user interface of a first computer application;
   determining a first scenario of the first computer application that the IME is to input the one or more candidates into;
   determining a query input by the user into a user interface of the IME;
   determining, based on the first scenario of the first computer application and the query, first scores for different types of input candidates, each first score indicating a likelihood that a respective type of input candidate is associated with a context of the first scenario and the query;
   determining, based at least in part on the first scores, a desired first type of input candidate from the types of input candidates to be presented at the user interface of the IME;
   identifying or generating a first set of input candidates at least partly based on a first relevancy of individual input candidates of the first set of input candidates to the first scenario, the query, and the desired first type of input candidate;
   presenting the first set of input candidates via the user interface of the IME;
   receiving a first selection of at least one input candidate of the first set of input candidates;
   inputting the selected at least one input candidate into the first user interface of the first computer application, the first computer application being separate from the IME;
   determining that the user has entered the query into the user interface of the IME to input one or more second input candidates into a second user interface of a second computer application, the second computer application being separate from the first computer application and the IME;
   determining a second scenario of the second computer application that the IME is to input the one or more second candidates into;
   determining, based on the second scenario of the second computer application and the query, second scores for different types of input candidates, each second score indicating a likelihood that a respective type of input candidate is associated with a context of the second scenario and the query; and
   presenting based at least in part on the second scores, a second set of input candidates via the user interface of the IME, wherein at least one input candidate of the second set of input candidates is not included in the first set of input candidates.

2. A method as recited in claim 1, further comprising ranking one or more input candidates of the first set of input candidates at least partly based on the relevancy of the one or more input candidates to the first scenario.

3. A method as recited in claim 1, wherein determining the first scenario comprises:
   collecting data relating to previous input of the user associated with the first application; and
   analyzing the collected data to determine the scenario application.

4. A method as recited in claim 3, wherein the data further comprises data relating to a user history associated with scenario of the first computer application.

5. A method as recited in claim 3, wherein the data comprises a context of the query in view of contents displayed at the first user interface.

6. A method as recited in claim 1, wherein the desired type of input candidate comprises at least one of a text candidate or a rich candidate.

7. A method as recited in claim 1, wherein the identifying or generating comprises:
   identifying an engine pool, the engine pool including a plurality of input search engines, each input search engine of the plurality of input search engines being preset to search a specific type of input candidate applicable to a specific scenario;
   selecting an input search engine preset for the first type of input candidate applicable to the first scenario; and
   using the input search engine to identify the first set of input candidates.

8. A method as recited in claim 1, wherein the presenting further comprises presenting the first set of input candidates including text candidates and rich candidates at the user interface of the IME, the user interface of the IME being separate from the first user interface of the first computer application.

9. A method as recited in claim 8, wherein the user interface of the IME includes a text candidate window and a rich candidate window; and
   the presenting further comprises:
   presenting the text candidates in the text candidate window; and
   presenting the rich candidates in the rich candidate window.

10. One or more computer storage media having stored thereupon a plurality of computer executable instructions that, when executed by a processor, causes the processor to perform operations comprising:
   determining that a user is using an input method editor (IME) to input one or more first input candidates into a first user interface of a first computer application;
   determining a first scenario of the first computer application that the IME is to input the one or more candidates into;
   determining a query input by the user into a user interface of the IME;
   determining, based on at least one of the first scenario of the input of the user or the query input by the user, scores for different types of input candidates, each score indicating a likelihood that a respective type of input candidate is associated with a context of the scenario and the query;
   determining, based at least in part on the scores, a desired type of input candidate from the types of input candidates to be presented at the user interface of the IME;
   identifying or generating a first set of rich candidates at least partly based on a relevancy of individual rich candidates of the first set of rich candidates to the scenario, the desired type of input candidate, and the query;

transmitting at least one rich candidate of the first set of rich candidates for use by the user interface of the first computer application, the first computer application being separate from the IME;

determining that the user has entered the query into the user interface of the IME to input one or more second input candidates into a second user interface of a second computer application, the second computer application being separate from the first computer application and the IME;

determining a second scenario of the second computer application that the IME is to input the one or more second candidates into;

determining, based on the second scenario of the second computer application and the query, second scores for different types of input candidates, each second score indicating a likelihood that a respective type of input candidate is associated with a context of the second scenario and the query; and presenting based at least in part on the second scores, a second set of rich candidates via the user interface of the IME, wherein at least one rich candidate of the second set of rich candidates is not included in the first set of rich candidates.

11. One or more computer storage medium as recited in claim 10, wherein the first set of rich candidates include at least one of an image, a video, or an address book entry.

12. One or more computer storage medium as recited in claim 10, wherein the identifying or generating the first set of rich candidates includes transforming a first rich candidate of the first set of rich candidates into a file type that is compatible with the first computer application.

13. One or more computer storage medium as recited in claim 10, wherein the identifying or generating comprises:
    finding different sources of individual rich candidates of the first set of rich candidates; and
    representing the different sources in the user interface of the IME for the user to view the first set of rich candidates from each source of the different sources.

14. One or more computer storage medium as recited in claim 10, wherein the identifying or generating comprises using web services to search for one or more rich candidates by using the scenario and the query as parameters.

15. One or more computer storage medium as recited in claim 10, wherein the identifying or generating comprises:
    storing an authentication credential of the user to a web service;
    accessing the web service by using the authentication credential;
    searching information stored at the web service based on the one or more queries to identify individual rich candidates of the first set of candidates.

16. One or more computer storage medium as recited in claim 10, further comprising presenting the first set of rich candidates in an embedded web browser using a hypertext markup language (HTML) 5.0 format.

17. A system comprising:
    memory storing one or more modules;
    one or more processors operably coupled to the memory to execute the one or more modules, the one or more modules including:
    a user interface of an IME that receives a query from a user;
    a collection component that collects data, the data comprising:
        first data relating to a first scenario of a first computer application to which the user is to input one or more input candidates,
        a first context of the query in view of contents displayed at a first user interface of the first computer application,
        second data relating to a second scenario of a second computer application to which the user is to input one or more input candidates, and
        a second context of the query in view of contents displayed at a second user interface of the second computer application;
    an analysis component that analyzes the collected data to determine scores for different types of input candidates, each score indicating a likelihood that a rich candidate is associated with the first context or the second context, and to determine, based in part on the scores:
        a desired first type of input candidate to request in association with the first computer application, and
        a desired second type of input candidate to request in association with the second computer application, the desired first type of input candidate being one of a text candidate or a rich candidate;
    a selection component that selects:
        a first scenario-tuned and type-specific input candidate engine from an engine pool based on the query, the first scenario, and the determined first desired type of input candidate to identify a first set of input candidates, and
        a second scenario-tuned and type-specific input candidate engine from an engine pool based on the query, the second scenario, and the determined second desired type of input candidate to identify a second set of input candidates; and
    a presentation component that:
        displays the first set of input candidates at the user interface of the IME,
        receives a first selection of at least a first input candidate of the first set of input candidates,
        based at least in part on the first selection, transmits the first input candidate to a first user interface of the first computer application, the user interface of the IME being separate from the first user interface of the first computer application,
        displays the second set of input candidates at the user interface of the IME, wherein at least one input candidate of the second set of input candidates is not included in the first set of input candidates,
        receives a second selection of at least a second input candidate of the second set of input candidates, and
        based at least in part on the second selection, transmits the second input candidate to a second user interface of the second computer application, the user interface of the IME being separate from the second user interface of the second computer application.

18. The system as recited in claim 17, wherein the engine pool includes one or more scenario-tuned text candidate input candidate engines and one or more scenario-tuned rich candidate engines, the one or more scenario-tuned text candidate input candidate engines having a scenario-tuned language model and a scenario-tuned lexicon, the one or more scenario-tuned rich candidate input candidate engines including a web service for the scenario.

19. The system as recited in claim 17, where in the engine pool is separate from a client device where the query is received and the first set of input candidates and the second set of input candidates are presented.

20. The system as recited in claim 17, where in the engine pool is located at a client device where the query is received and the first set of input candidates and the second set of input candidates are presented.

* * * * *